(12) United States Patent
Tanabe et al.

(10) Patent No.: US 11,787,359 B2
(45) Date of Patent: Oct. 17, 2023

(54) VEHICLE SEAT

(71) Applicant: TS TECH CO., LTD., Saitama (JP)

(72) Inventors: Jinichi Tanabe, Tochigi (JP); Katsuya Isomura, Tochigi (JP); Sosaku Omori, Tochigi (JP); Keita Wakesu, Tochigi (JP); Kenji Matsuoka, Tochigi (JP); Yuta Sugaya, Tochigi (JP)

(73) Assignee: TS TECH CO., LTD., Saitama (JP)

( * ) Notice: Subject to any disclaimer, the term of this patent is extended or adjusted under 35 U.S.C. 154(b) by 0 days.

(21) Appl. No.: 17/968,184

(22) Filed: Oct. 18, 2022

(65) Prior Publication Data

US 2023/0115864 A1   Apr. 13, 2023

Related U.S. Application Data

(63) Continuation of application No. 17/045,195, filed as application No. PCT/JP2019/014679 on Apr. 2, 2019, now Pat. No. 11,491,944.

(30) Foreign Application Priority Data

Apr. 5, 2018   (JP) ................................. 2018-073513
Apr. 5, 2018   (JP) ................................. 2018-073514
(Continued)

(51) Int. Cl.
*B60R 21/207*   (2006.01)
*B60N 2/30*   (2006.01)
(Continued)

(52) U.S. Cl.
CPC .......... *B60R 21/207* (2013.01); *B60N 2/3075* (2013.01); *B60N 2/58* (2013.01);
(Continued)

(58) Field of Classification Search
CPC .......... B60R 21/207; B60R 2021/2078; B60N 2/3075; B60N 2/68
See application file for complete search history.

(56) References Cited

U.S. PATENT DOCUMENTS 5,893,579 A   4/1999   Kimura
6,578,911 B2   6/2003   Harada
(Continued)

FOREIGN PATENT DOCUMENTS

JP   H9150706   6/1997
JP   2010184668   8/2010
(Continued)

OTHER PUBLICATIONS

International Search Report for PCT/JP/2019/014679, dated May 31, 2019, 4 pages.

*Primary Examiner* — Drew J Brown
*Assistant Examiner* — Tiffany L Webb
(74) *Attorney, Agent, or Firm* — Dority & Manning, PA

(57) ABSTRACT

In a vehicle seat having an airbag module placed in the seatback thereof, the load that may be applied to the back side of the seatback is prevented from being applied to the airbag module. The vehicle seat (1, 300, 400) comprise a seatback frame (19) including a pair of side members (26, 301) extending vertically along either side thereof and providing a structural framework of a seatback, a plate member (20, 402) positioned behind the seatback frame and including an extension (32, 410) extending in an outboard direction from the side member located on an outboard side of the seatback frame, a mounting member connected to the outboard side member, and an airbag module (23) positioned on a front side of the extension and connected to the (Continued)

outboard side member via the mounting member, a clearance (S) being defined between the airbag module and the extension.

5 Claims, 17 Drawing Sheets

(30) Foreign Application Priority Data

| Apr. 5, 2018 | (JP) | 2018-073515 |
|---|---|---|
| Apr. 5, 2018 | (JP) | 2018-073516 |
| Apr. 5, 2018 | (JP) | 2018-073517 |

(51) Int. Cl.
*B60N 2/68* (2006.01)
*B60N 2/58* (2006.01)
*B60R 21/2165* (2011.01)

(52) U.S. Cl.
CPC .......... *B60N 2/686* (2013.01); *B60R 21/2165* (2013.01); *B60N 2002/5808* (2013.01); *B60R 2021/2078* (2013.01)

(56) References Cited

U.S. PATENT DOCUMENTS

| 7,331,601 | B2 | 2/2008 | Tracht |
| 7,891,701 | B2 | 2/2011 | Tracht |
| 8,075,053 | B2 | 12/2011 | Tracht |
| 8,104,789 | B2* | 1/2012 | Tracht ............... B60R 21/207 |
| | | | 280/730.2 |
| 9,592,789 | B2* | 3/2017 | Fujiwara ............ B60R 21/235 |
| 9,688,230 | B2 | 6/2017 | Makita |
| 9,707,917 | B2 | 7/2017 | Shiga |
| 11,325,552 | B2* | 5/2022 | Saitou ............... B60R 21/215 |
| 11,491,944 | B2* | 11/2022 | Tanabe ............. B60R 21/2165 |

FOREIGN PATENT DOCUMENTS

| JP | 7017067007 | 3/2012 |
| JP | 5169864 | 3/2013 |
| JP | 2017087946 | 5/2017 |
| JP | 2017087949 | 5/2017 |

* cited by examiner

VEHICLE SEAT

CROSS REFERENCE TO RELATED APPLICATIONS

This application is a continuation of U.S. patent application Ser. No. 17/045,195 having a filing date of Oct. 5, 2020, which is the U.S. National Stage entry of International Application No. PCT/JP2019/014679 filed under the Patent Cooperation Treaty and having a filing date of Apr. 2, 2019, which claims priority to Japanese Patent Application No. 2018-073513 having a filing date of Apr. 5, 2018, Japanese Patent Application No. 2018-073514 having a filing date of Apr. 5, 2018, Japanese Patent Application No. 2018-073515 having a filing date of Apr. 5, 2018, Japanese Patent Application No. 2018-073516 having a filing date of Apr. 5, 2018, and Japanese Patent Application No. 2018-073517 having a filing date of Apr. 5, 2018, all of which are incorporated herein by reference.

TECHNICAL FIELD

The present invention relates to a vehicle seat fitted with an airbag.

BACKGROUND ART

A known vehicle seat suitable for a rear seat is provided with an airbag module placed in a seatback which can be moveable between an upright position where the seatback faces forward to support the back of the seat occupant, and a stowed position where the seatback is tilted forward so that the back surface of the seatback extends continuously with the floor surface of a cargo compartment (see Patent Document 1, for example). The seatback of the vehicle seat disclosed in Patent Document 1 includes a back frame serving as a structural framework, and a plate-like back panel attached to the back side of the back frame. The back frame includes a metal pipe member bent into a substantially rectangular shape, and the back panel is a plate member which is substantially rectangular in shape, and covers the back side of the pipe member.

The back panel is provided with an extension extending in the outboard direction from the back frame, and the extension is provided with a plurality of bosses projecting toward the side of the back frame to have an airbag module fastened to the protruding top surfaces of the bosses.

PRIOR ART DOCUMENT(S)

Patent Document(s)

Patent Document 1: JP5169864B2

SUMMARY OF THE INVENTION

Task to be Accomplished by the Invention

Since the airbag module is directly fastened to the back panel, the load that may be applied to the back side of the seatback tends to be applied to the airbag module, and may even cause a change in the position of the airbag module.

In view of such a problem of the prior art, a primary object of the present invention is to provide a vehicle seat having an airbag module placed in the seatback thereof in which the load that may be applied to the back side of the seatback is prevented from being applied to the airbag module.

Means to Accomplish the Task

To achieve such an object, an aspect of the present invention provides a vehicle seat (1, 300, 400), comprising: a seatback frame (19) including a pair of side members (26, 301) extending vertically along either side thereof and providing a structural framework of a seatback; a plate member (20, 402) positioned behind the seatback frame and including an extension (32, 410) extending in an outboard direction from the side member located on an outboard side of the seatback frame; a mounting member connected to the outboard side member; and an airbag module (23) positioned on a front side of the extension and connected to the outboard side member via the mounting member, a clearance (S) being defined between the airbag module and the extension.

According to this arrangement, since a clearance is defined between the airbag module and the extension, the load applied to the extension is prevented from being transmitted to the airbag module so that the movement of an airbag module can be prevented.

In another aspect of the present invention, the mounting member includes a first mounting member (36, 302) directly connected to the outboard side member (26), and a second mounting member (47, 303) directly connected to the airbag module, and the second mounting member is connected to the first mounting member via a fastener (72), the plate member being provided with a through hole (74) passed along an axial line of the fastener.

According to this arrangement, the second mounting member can be fastened to the first mounting member from the rear of the pan frame by inserting the tool into the through hole. Thereby, an airbag module can be easily assembled to the side member.

In yet another aspect of the present invention, preferably, the first mounting member is provided with a slanted wall (64) which is slanted in an inboard direction toward a rear end part thereof, and provided with a fastening portion (65) to which the second mounting portion is fastened.

According to this arrangement, the fastening portion is provided in the slanted wall that faces obliquely rearward. Thereby, the fastening portion can be positioned so as to be visually recognized from the back of the plate member.

In yet another aspect of the present invention, preferably, a rear end part of the second mounting member is provided with a plate-like fastened portion (69) extending along the slanted wall, and the airbag module is provided with an airbag configured to be deployed in a forward direction, a front part of the fastened portion being connected to the second mounting member.

According to this arrangement, since the airbag module is located in front of the fastened portion, the airbag is less likely to contact the fastener when the airbag is deployed in the forward direction. Therefore, deformation of the airbag at the time of deployment can be prevented.

In yet another aspect of the present invention, preferably, the outboard side member (301) is provided with an extension wall (305) extending in an outboard direction and having a surface facing upward, and
the mounting member includes a first mounting member connected to an outboard side of the outboard side member, and a second mounting member (303) having an upper end provided with an upper wall (311) extending in an inboard direction along the upwardly facing surface of the extension wall and fastened to the extension wall, and a lower end engaging the first mounting member.

According to this arrangement, since the airbag module can be fastened to the side member by inserting the tool downward, the airbag module can be connected to the side member without being obstructed by the plate member.

In yet another aspect of the present invention, preferably, the extension is provided with a raised piece (411) which is raised in a forward direction therefrom, and the mounting member includes a first mounting member (401) connected to an outboard side of the outboard side member, and a second mounting member (403) having a front end engaged by the first mounting member and a rear end fastened to a rear side of the raised piece, the second mounting member having the airbag module directly connected thereto.

According to this arrangement, since the second mounting member is connected to the side member and the plate member, the position of the airbag module can be further stabilized. Moreover, since the second mounting member is fastened to the rear surface of the raised piece, the second mounting member can be visually recognized from the back of the plate member at the time of fastening. Thereby, the second mounting member can be fastened to the raised piece with ease.

Another aspect of the present invention provides a vehicle seat (1, 200, 300), comprising: a seatback frame (19) including a pair of side members (26) extending vertically along either side thereof and providing a structural framework of a seatback (5); a plate member (20) positioned behind the seatback frame (19) and including an extension (32) extending in an outboard direction from the side member located on an outboard side of the seatback frame; a mounting member (36, 37, 101, 102, 201, 202) connected to the outboard side member; and an airbag, module (23) located in front of the extension and connected to the outboard side member via the mounting member.

According to this arrangement, the airbag module is connected to the side member having a higher rigidity than the plate member. Since the thickness of the plate member can be made small as compared with the case where the airbag module is supported by the plate member, the seatback can be reduced in weight, and the airbag module can be supported in a stable manner.

In another aspect of the present invention, the mounting member includes a first mounting member (36, 101, 201) directly connected to the outboard side member, and a second mounting member (37, 102, 202) directly connected to the airbag module, and the second mounting member is connected to the first mounting member via a fastener (72), the first mounting member being provided with a slanted wall (64) which is slanted in an inboard direction toward a rear end part thereof, and provided with a fastening portion (65) to which the second mounting portion is fastened.

According to this arrangement, since the fastener is provided on the slanted wall, the protrusion of the head of the fastener toward the airbag module can be minimized. Thereby, the airbag can be more reliably deployed.

In yet another aspect of the present invention, preferably, the plate member is provided with a through hole (74) passed along an axial line of the fastener.

According to this arrangement, the second mounting member can be fastened to the first mounting member from the rear of the pan frame by inserting the tool into the through hole. Thereby, the airbag module can be assembled to the side member with ease. Moreover, the fastening portion is provided on the slanted wall which faces obliquely rearward. Thereby, the fastening portion provided in the slanted wall can be visually recognized from the rear so that the fastening of the fastener is facilitated.

In yet another aspect of the present invention, preferably, a rear end part of the second mounting member is provided with a plate-like fastened portion (69, 212) extending along the slanted wall, and the airbag module is provided with an airbag configured to be deployed in a forward direction, a front part, of the fastened portion being connected to the second mounting member.

According to this arrangement, since the airbag module is located on the front side of the fastened portion, the airbag is prevented from contacting the fastener when the airbag is deployed in the forward direction. Therefore, the airbag can be more reliably deployed.

In yet another aspect of the present invention, preferably, the first mounting member includes a pair of first mounting members positioned on the outboard side member one above the other.

According to this arrangement, since the second mounting member is connected to the first mounting members provided at two locations one above the other, the airbag module and the side member can be connected to each other in a highly firm manner.

In yet another aspect of the present invention, preferably, the seatback can be moved between a use position where the seatback face forward, and a stowed position where the back side of the seatback extends in parallel with a floor surface, and the plate member is provided with a closure member (75) closing the tool hole.

According to this arrangement, the closure member allows the back side of the seatback to be flatter. Thereby, the stability of the cargo placed on the back surface of the seatback in the stowed position can be improved.

In yet another aspect of the present invention, preferably, the mounting member includes a first mounting member directly connected to the outboard side member, and a second mounting member directly connected to the airbag module, and the first mounting member is provided with a rear wall portion (105) extending laterally on an outboard side of the outboard side member, the second mounting member being fastened to the rear wall portion via a fastener.

According to this arrangement, the fastening portion is formed on the rear wall portion having a major plane facing in the fore and aft direction so that a tool can be passed through a through hole of the pan frame from the rear to the front to fasten the first mounting member and the second mounting member to each other. Therefore, the direction of inserting the tool is obvious to the worker, and the assembling of the airbag module is facilitated.

Yet another aspect of the present invention provides a vehicle seat (1, 200, 300), comprising: a seatback frame (19) providing a structural framework of a seatback (5); a plate member (20) positioned behind the seatback frame and including an extension (32) extending in an outboard direction from the side member located on an outboard side of the seatback frame; a mounting member (36, 47, 101, 102, 201, 202) connected to the seatback frame; and an airbag module (23) positioned on a front side of the extension and connected to the seatback frame via the mounting member; wherein the mounting member includes a first mounting member (36, 101, 201) directly connected to the seatback frame and a second mounting member (37, 102, 202) directly connected to the airbag module, and the second mounting member is fastened to the first mounting member via a fastener (72), the plate member being provided with a through hole (74) passed along an axial line of the fastener.

According to this arrangement, the airbag module is connected to the seatback frame having a higher rigidity than the plate member. As a result, the thickness of the plate member can be made smaller than in the case where the airbag module is supported by the plate member so that the seatback can be reduced in weight, and can support the airbag module in a stable manner. Also, the second mounting member can be fastened to the first mounting member from the back of the pan frame by inserting a tool into the through hole so that the airbag module can be assembled to the side member with ease.

In yet another aspect of the present invention, preferably, the seatback frame includes a pair of side members (26) extending vertically on either side thereof, and the first mounting member is directedly connected to the side member on an outboard side.

According to this arrangement, the airbag module can be connected to the seatback from the lateral direction by connecting the first mounting member to the side member. Thereby, the airbag can be deployed through a gap defined between the seat occupant and the side wall of the cabin so as to effectively protect the seat occupant.

Yet another aspect of the present invention provides a vehicle seat (1), comprising: a seatback frame (19) including a pair of side members (26) extending vertically along either side thereof and providing a structural framework of a seatback (5); a plate member (20) positioned behind the seatback frame and including an extension (32) extending in an outboard direction from the side member located on an outboard side of the seatback frame; a mounting member (201, 202) connected to the seatback frame; and an airbag module (23) positioned on a front side of the extension and connected to the seatback frame via the mounting member; wherein the mounting member includes a first mounting member (201) directly connected to the seatback frame and a second mounting member (202) directly connected to the airbag module, and the first mounting member is positioned between the outboard side member and the plate member, and is in contact with a front surface of the plate member.

According to this arrangement, the first mounting member is connected to the side frame and abuts against the front surface of the plate member. Since the airbag, module is connected to the side member, the airbag module can be supported in a stable manner. Compared to the case where the airbag module is supported only by the plate member, the plate member can be reduced in thickness so that the seatback is reduced in weight while the airbag module is supported in a stable manner. Further, by abutting the first member against the plate member, the plate member can be reinforced.

In yet another aspect of the present invention, preferably, the first mounting member is provided with an abutting portion (208) abutting against the front surface of the extension.

According to this arrangement, the extension which is otherwise readily deformable can be reinforced by the abutting portion.

In yet another aspect of the present invention, preferably, the first mounting member and the second mounting member are fastened to each other via a fastener (216), and the plate member is provided with a through hole passed along an axial line of the fastener (220).

According to this arrangement, since a tool can be inserted into the through hole from the rear of the plate member to fasten the second mounting member and the first mounting member to each other, the assembly of the airbag module is facilitated.

In yet another aspect of the present invention, preferably, the first mounting member is provided with a slanted wall (207) inclining forward toward an inboard side thereof, and the second mounting member is fastened to the slanted wall of the first mounting member.

According to this arrangement, since the fastening portion can be provided on the slanted wall facing obliquely rearward, fastening from the rear of the plate member is facilitated. Further, since the slanted wall is inclined obliquely forward from the abutting portion at which the slanted wall is supported by the plate member, the head of the fastener is prevented from protruding rearward from the rear surface of the plate member so that the back surface of the seatback can be made highly flat.

In yet another aspect of the present invention, preferably, the abutting portion has a plate shape extending along the front surface of the extension.

According to this arrangement, the contact area between the abutting portion and the extension can be maximized so that the extension can be reinforced by the abutting portion in an even more reliable manner.

In yet another aspect of the present invention, preferably, the first mounting member is welded to the plate member at the abutting portion.

According to this arrangement, the abutting portion and the extension are firmly connected to each other so that the extension can be more reliably reinforced by the abutting portion.

In yet another aspect of the present invention, preferably, the plate member extends in an outboard direction beyond the abutting portion, and is bent forward along an outboard end surface of the abutting portion.

According to this arrangement, since the plate member is bent forward at the outboard edge thereof, the rigidity of the plate member can be increased. Moreover, since the plate member is bent along the outboard edge of the abutting portion, no gap is created between the abutting portion and the bent portion of the outboard edge of the plate member so that the part of the plate member adjoining the outboard edge thereof can be reinforced by the abutting portion in a reliable manner. Thereby, the deformation of the part of the plate member adjoining the outboard edge thereof is prevented in an even more reliable manner.

Yet another aspect of the present invention provides a vehicle seat (500), comprising: a seatback frame (19) including a pair of side members (26) extending vertically along either side thereof and providing a structural framework of a seatback (5); a mounting member (501, 502) connected to the outboard side member; an airbag module (23) connected to the outboard side member via the mounting member; a pad member (21) placed on a front side of the airbag module; a skin member (22) covering a front side of the pad member and provided with a frangible portion (57) configured to be ripped apart under a loading exceeding a prescribed value; a passage (502) provided in the pad member to communicate the airbag module with the frangible portion; a wire member (502) having one end connected to the outboard side member, an engaging portion (521) placed on a front side of the airbag module, and another end connected to the outboard side member; and a webbing passed through the passage and having one end connected to the frangible portion and another end connected to the engaging portion.

According to this arrangement, the webbing is connected to the engaging portion located in front of the airbag module.

Since the engaging portion is located in front of the airbag module so as to be clearly visible from a side of the seatback, it is possible to confirm that the webbing is connected to the appropriate position of the wire member with ease.

In yet another aspect of the present invention, preferably, the mounting member includes a hook (510) that is engaged to the engaging portion.

According to this arrangement, by engaging the mounting member to the wire member, the movement of the airbag module is restricted, and the position of the airbag module is kept fixed at the time of fastening. This facilitates the assembly of the airbag module. Further, since the airbag module is engaged to the wire member that connects the webbing to the side member, the side member is not required to be provided with a separate engaging member so that the structure is simplified.

In yet another aspect of the present invention, preferably, the mounting member includes a first mounting member (501) connected to an outboard side of the outboard side member, and a second mounting member (502) connected to the airbag module, and the second mounting member is provided with a fastening portion (504) while the first mounting member is provided with a fastened portion (506) that can be fastened to the fastening portion in such a manner that the airbag module can be placed in a position where the fastening member and the fastening portion align with each other by engaging the hook to the wire member and turning the airbag module around an axial line of the wire member.

According to this arrangement, the airbag module can be guided to the position where the fastening portion and the fastened portion are aligned with each other by engaging the hook to the wire member and turning the airbag module. Thereby, the airbag module can be easily placed in an appropriate position for the airbag module to be fastened to the side member with ease.

In yet another aspect of the present invention, preferably, the frangible portion and the engaging portion extend vertically substantially in parallel to each other.

According to this arrangement, the webbing can be placed along the frangible portion so that the load due to the inflation of the airbag can be concentrated on the frangible portion in an effective manner.

In yet another aspect of the present invention, preferably, the hook is provided on a front edge of the second support member, and the fastening portion is provided on a rear edge of the second support member.

According to this arrangement, since the second support member is engaged to the wire member at the front edge thereof, and fastened to the side member at the rear edge thereof, the second support member and the side member can be firmly connected to each other. As a result, the movement of airbag module relative to the side member is minimized, and the position of the airbag module at the time of deployment can be stabilized.

In yet another aspect of the present invention, preferably, the vehicle seat further comprises a plate member (20) extending from the rear edge of the outboard side member in the outboard direction, and a first mounting member (501) is provided on an outboard side of the outboard side member, the plate member being provided with a through hole (74) passed along an axial line of a fastener that fastens the fastening portion and the fastened portion to each other.

According to this arrangement, the fastener can be accessed from the rear of the plate member by inserting a tool into the through hole from the rear to the front. By thus allowing the first mounting member and the second mounting member to be fastened to each other from the rear of the plate member, the assembly work for the airbag module is facilitated.

In yet another aspect of the present invention, preferably, the airbag module is configured to deploy the airbag (41) in a forward direction, and is positioned in front of the fastening portion.

According to this arrangement, the airbag is prevented from coming into contact with the fastener at the time of deployment so that the deformation of the airbag due to such a contact between the airbag and the fastener can be prevented, and the airbag can be deployed in a more reliably manner.

Effect of the Invention

In such arrangements in a vehicle seat having an airbag module placed in the seatback thereof, owing to the presence of a clearance between the airbag module and the pan frame, the load that may be applied to the back side of the seatback is prevented from being applied to the airbag module.

In the arrangement where the mounting member includes a first mounting member (36, 302) directly connected to the outboard side member (26), and a second mounting member (47, 303) directly connected to the airbag module, and the second mounting member is connected to the first mounting member via a fastener (72), the plate member being provided with a through hole (74) passed along an axial line of the fastener, the second mounting member can be fastened to the first mounting member from the rear of a pan frame by inserting the tool into the through hole. Thereby, an airbag, module can be easily assembled to the side member.

In the arrangement where the first mounting member is provided with a slanted wall (64) which is slanted in an inboard direction toward a rear end part thereof, and provided with a fastening portion (65) to which the second mounting portion is fastened, the fastening portion is provided in the slanted wall that faces obliquely rearward. Thereby, the fastening portion can be positioned so as to be visually recognized from the back of the plate member.

In the arrangement where a rear end part of the second mounting member is provided with a plate-like fastened portion (69) extending along the slanted wall, and the airbag module is provided with an airbag configured to be deployed in a forward direction, a front part of the fastened portion being connected to the second mounting member, since the airbag module is located in front of the fastened portion, the airbag is less likely to contact the fastener when the airbag is deployed in the forward direction. Therefore, deformation of the airbag at the time of deployment can be prevented.

In the arrangement where the outboard side member (301) is provided with an extension wall (305) extending in an outboard direction and haying a surface facing upward, and the mounting member includes a first mounting member connected to an outboard side of the outboard side member, and a second mounting member (303) having an upper end provided with an upper wall (311) extending in an inward direction along the upwardly facing surface of the extension wall and fastened to the extension wall, and a lower end engaging the first mounting member, since the airbag module can be fastened to the side member by insetting the tool downward, the airbag module can be connected to the side member without being obstructed by the plate member.

In the arrangement where the extension is provided with a raised piece (411) which is raised in a forward direction therefrom, and the mounting member includes a first mounting member connected to an outboard side of the outboard side member, and a second mounting member (403) having a front end engaged by the first mounting member (401) and a rear end fastened to a rear side of the raised piece, the second mounting member having the airbag module directly connected thereto, since the second mounting member is connected to the side member and the plate member, the position of the airbag module can be further stabilized. Moreover, since the second mounting member is fastened to the rear surface of the raised piece, the second mounting member can be visually recognized from the back of the plate member at the time of fastening. Thereby, the second mounting member can be fastened to the raised piece with ease.

In the arrangement where the airbag module is connected to the side member having a higher rigidity than the pan frame, the seatback can be reduced in weight, and the airbag module can be supported in a stable manner.

In the arrangement where the mounting member includes a first mounting member (36, 101, 201) directly connected to the outboard side member, and a second mounting member (37, 102, 202) directly connected to the airbag, module, and the second mounting member is connected to the first mounting member via a fastener (72), the first mounting member being provided with a slanted wall (64) which is slanted in an inboard direction toward a rear end part thereof, and provided with a fastening portion (65) to which the second mounting portion is fastened, since the fastener is provided on the slanted wall, the protrusion of the head of the fastener toward the airbag module can be minimized. Thereby, the airbag can be more reliably deployed.

In the arrangement where the plate member is provided with a through hole (74) passed along an axial line of the fastener, the second mounting member can be fastened to the first mounting member from the rear of the pan frame by inserting the tool into the through hole. Thereby, the airbag module can be assembled to the side member with ease. Moreover, the fastening portion is provided on the slanted wall which faces obliquely rearward. Thereby, the fastening portion provided in the slanted wall can be visually recognized from the rear so that the fastening of the fastener is facilitated.

In the arrangement where a rear end part of the second mounting member is provided with a plate-like fastened portion (69, 212) extending along the slanted wall, and the airbag module is provided with an airbag configured to be deployed in a forward direction, a front part of the fastened portion being connected to the second mounting member, since the airbag module is located on the front side of the fastened portion, the airbag is prevented from contacting the fastener when the airbag is deployed in the forward direction. Therefore, the airbag, can be more reliably deployed.

In the arrangement where the first mounting member includes a pair of first mounting members positioned on the outboard side member one above the other, since the second mounting member is connected to the first mounting members provided at two locations one above the other, the airbag module and the side member can be connected to each other in a highly firm manner.

In the arrangement where the seatback can be moved between a use position where the seatback face forward, and a stowed position where the back side of the seatback extends in parallel with a floor surface, and the plate member is provided with a closure member (75) closing the tool hole, the closure member allows the back side of the seatback to be flatter. Thereby, the stability of the cargo placed on the back surface of the seatback in the stowed position can be improved.

In the arrangement where the mounting member includes a first mounting member directly connected to the outboard side member, and a second mounting member directly connected to the airbag module, and the first mounting member is provided with a rear wall portion (105) extending laterally on an outboard side of the outboard side member, the second mounting member being fastened to the rear wall portion via a fastener, the fastening portion is formed on the rear wall portion having a major plane facing in the fore and aft direction so that a tool can be passed through the through hole of the pan frame from the rear to the front to fasten the first mounting member and the second mounting member to each other. Therefore, the direction of inserting the tool is obvious to the worker, and the assembling of the airbag module is facilitated.

In the arrangement where the airbag module is connected to the seatback frame having a higher rigidity than the pan frame, the seatback can be reduced in weight, and the airbag module can be supported in a stable manner.

In the arrangement where the seatback frame includes a pair of side members (26) extending vertically on either side thereof, and the first mounting member is directedly connected to the side member on an outboard side, the airbag module can be connected to the seatback from the lateral direction by connecting the first mounting member to the side member. Thereby, the airbag can be deployed through a gap defined between the seat occupant and the side wall of the cabin so as to effectively protect the seat occupant.

In the arrangement where the first side member is connected to the side frame in a vehicle seat having an airbag module installed in the seatback, the seatback can be reduced in weight, and the airbag module can be supported in a stable manner. Furthermore, by abutting the first mounting member against the plate member, the plate member can be reinforced by the first mounting member.

In the arrangement where the first mounting member is provided with an abutting portion (208) abutting against the front surface of the extension, the extension which is otherwise readily deformable can be reinforced by the abutting portion.

In the arrangement where the first mounting member and the second mounting member are fastened to each other via a fastener (216), and the plate member is provided with a through hole passed along an axial line of the fastener (220), since a tool can be inserted into the through hole from the rear of the plate member to fasten the second mounting member and the first mounting member to each other, the assembly of the airbag module is facilitated.

In the arrangement where the first mounting member is provided with a slanted wall (207) inclining forward toward an inboard side thereof, and the second mounting member is fastened to the slanted wall of the first mounting member, since the fastening portion can be provided on the slanted wall facing obliquely rearward, fastening from the rear of the plate member is facilitated. Further, since the slanted wall is inclined obliquely forward from the abutting portion at which the slanted wall is supported by the plate member, the head of the fastener is prevented from protruding rearward from the rear surface of the plate member so that the back surface of the seatback can be made highly flat.

In the arrangement where the abutting portion has a plate shape extending along the front surface of the extension, the contact area between the abutting portion and the extension can be maximized so that the extension can be reinforced by the abutting portion in an even more reliable manner.

In the arrangement where the first mounting member is welded to the plate member at the abutting portion, the abutting portion and the extension are firmly connected to each other so that the extension can be more reliably reinforced by the abutting portion.

In the arrangement where the plate member extends in an outboard direction beyond the abutting portion, and is bent forward along an outboard end surface of the abutting portion, since the plate member is bent forward at the outboard edge thereof, the rigidity of the plate member can be increased. Moreover, since the plate member is bent along the outboard edge of the abutting portion, no gap is created between the abutting portion and the bent portion of the outboard edge of the plate member so that the part of the plate member adjoining the outboard edge thereof can be reinforced by the abutting portion in a reliable manner. Thereby, the deformation of the part of the plate member adjoining the outboard edge thereof is prevented in an even more reliable manner.

In the arrangement where the webbing is engaged by an engaging portion positioned in front of the airbag module in a vehicle seat provided with an airbag module, the component received in the seatback can be positioned so as to be dearly visible.

In the arrangement where the mounting member includes a hook (510) that is engaged to the engaging portion, by engaging the mounting member to the wire member, the movement of the airbag module is restricted, and the position of the airbag module is kept fixed at the time of fastening. This facilitates the assembly of the airbag module. Further, since the airbag module is engaged to the wire member that connects the webbing to the side member, the side member is not required to be provided with a separate engaging member so that the structure is simplified.

In the arrangement where the mounting member includes a first mounting member (501) connected to an outboard side of the outboard side member, and a second mounting member (502) connected to the airbag module, and the second mounting member is provided with a fastening portion (504) while the first mounting member is provided with a fastened portion (506) that can be fastened to the fastening portion in such a manner that the airbag module can be placed in a position where the fastening member and the fastening portion align with each other by engaging the hook to the wire member and turning the airbag module around an axial line of the wire member, the airbag module can be guided to the position where the fastening portion and the fastened portion are aligned with each other by engaging the hook to the wire member and turning the airbag module. Thereby, the airbag module can be easily placed in an appropriate position for the airbag module to be fastened to the side member with ease.

In the arrangement where the frangible portion and the engaging portion extend vertically substantially in parallel to each other, the webbing can be placed along the frangible portion so that the load due to the inflation of the airbag can be concentrated on the frangible portion in an effective manner.

In the arrangement where the hook is provided on a front edge of the second support member, and the fastening portion is provided on a rear edge of the second support member, since the second support member is engaged to the wire member at the front edge thereof, and fastened to the side member at the rear edge thereof, the second support member and the side member can be firmly connected to each other. As a result, the movement airbag module relative to the side member is minimized, and the position of the airbag module at the time of deployment can be stabilized.

In the arrangement where the vehicle seat further comprises a plate member (20) extending from the rear edge of the outboard side member in the outboard direction, and a first mounting member (501) is provided on an outboard side of the outboard side member, the plate member being provided with a through hole (74) passed along an axial line of a fastener that fastens the fastening portion and the fastened portion to each other, the fastener can be accessed from the rear of the plate member by inserting a tool into the through hole from the rear to the front. By thus allowing the first mounting member and the second mounting member to be fastened to each other from the rear of the plate member, the assembly work for the airbag module is facilitated.

In the arrangement where the airbag module is configured to deploy the airbag (41) in a forward direction, and is positioned in front of the fastening portion, the airbag is prevented from coming into contact with the fastener at the time of deployment so that the deformation of the airbag due to such a contact between the airbag and the fastener can be prevented, and the airbag can be deployed in a more reliably manner.

BRIEF DESCRIPTION OF THE DRAWING(S)

DESCRIPTION OF THE PREFERRED EMBODIMENT(S)

Three embodiments of a vehicle seat according to the present invention as applied to a rearmost seat of a motor vehicle are described in the following with reference to the appended drawings. In the following description, the fore and aft, the lateral, and vertical directions are based on the forward direction of the motor vehicle. The vehicle seat can change the configuration and attitude thereof between a use position where an occupant can be seated and a stowed position which is modified from the use position to enlarge the space available for cargo, and the following description of the various structures will be based on the vehicle seat at the use position unless otherwise specified.

First Embodiment

Figure 1:
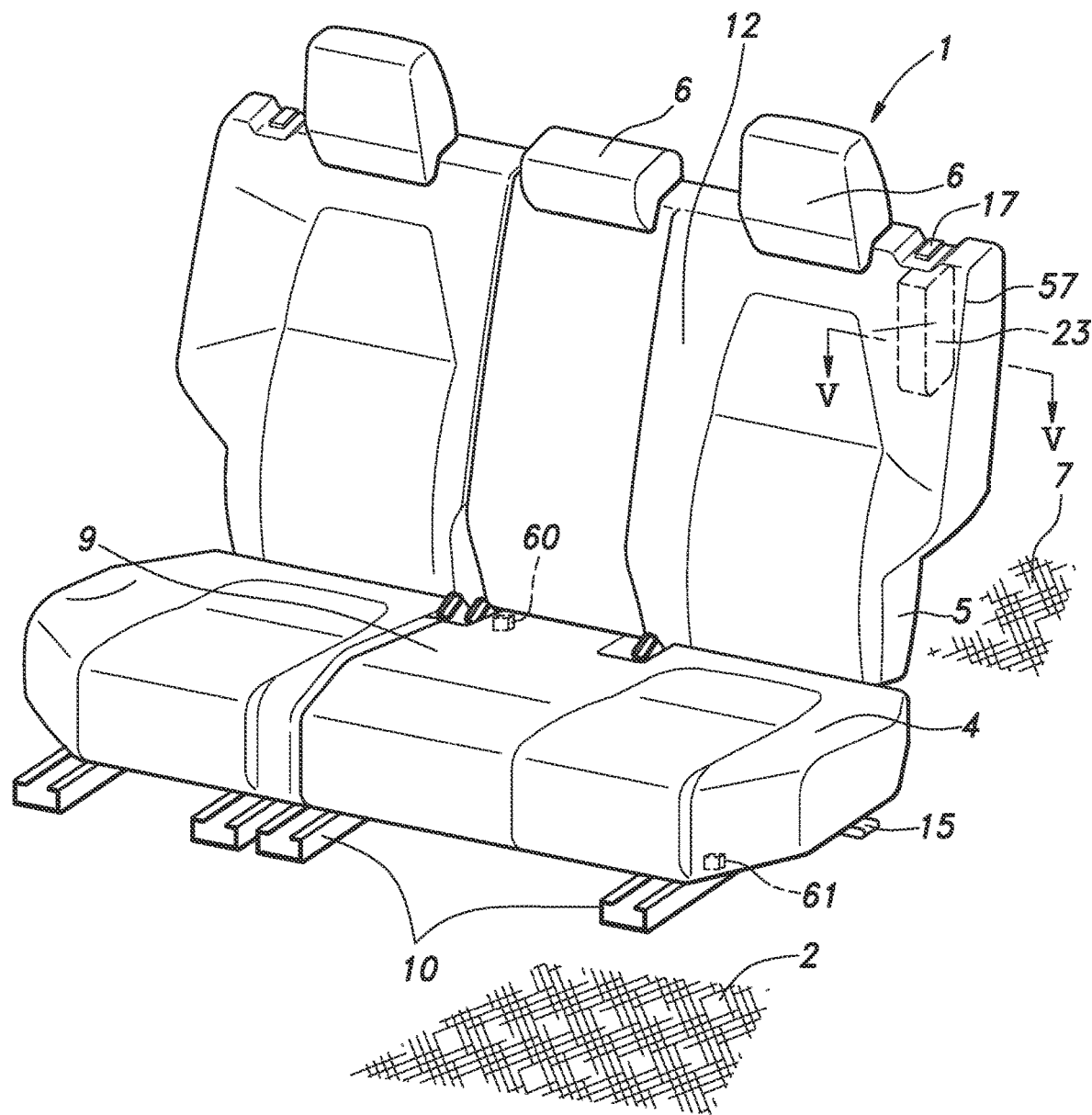
FIG. 1 is a perspective view of a vehicle seat according to the present invention is use position.

As shown in FIG. 1, a vehicle seat 1 according to the present invention constitutes a left side portion of a rear seat in a second row in an automobile having two rows of seats positioned one behind the other. The vehicle seat 1 is positioned on a floor 2 of the automobile, and includes a seat cushion 4 that supports the buttocks of a seat occupant, a seatback 5 that is supported by a rear part of the seat cushion 4 and functions as a backrest, and a headrest 6 provided in an upper part of the seatback 5. Behind the vehicle seat 1 is provided a substantially horizontal cargo floor 7 (see FIG. 2B) extending to the tailgate (rear gate).

The seat cushion 4 extends laterally, and defines a seating surface 9 for two occupants. A pair of lower rails each extending in the fore and aft direction, and connected to the upper surface of the floor 2 are located under the seat cushion 4. An upper rail is slidably engaged to each lower rail 10 so as to be slidable along the extending direction of the lower rail 10. The seat cushion 4 is thus supported by the floor 2 so as to be slidable in the fore and aft direction via the lower rails 10 and the upper rails.

The seatback 5 extends in the vertical direction and has a substantially rectangular shape having a surface facing forward. A support surface 12 that supports the backs of two passengers is formed on the front surface of the seatback 5. The seatback 5 is pivotably connected to the rear end of the frame structure forming the seat cushion 4 at a lower end thereof via a per se known reclining mechanism.

A pair of headrests 6 are provided on the upper end of the seatback 5 laterally next to each other. Each headrest 6 is connected to the seatback 5 at the lower end thereof so as to be pivotable about a laterally extending axial line.

Figure 2A:
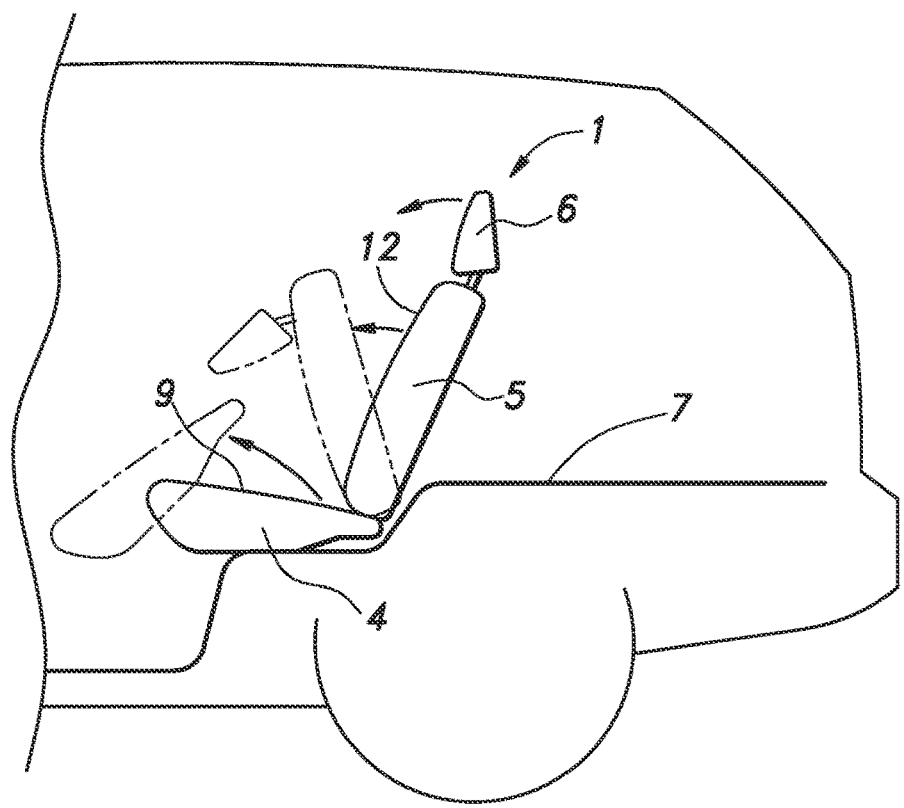
FIG. 2A shows an explanatory view of the vehicle seat showing the transition of the vehicle seat from the use position toward a stowed position.

A strap 15 extends in the outboard direction from a lower part of the outboard side of the seatback 5. When the strap 15 is pulled in the outboard direction, the seat cushion 4 and the seatback 5 can be moved from a use position (FIG. 2A) for seating an occupant to a stowed position (FIG. 2B) for enlarging the space for accommodating cargo. When the vehicle seat 1 is in the use position, the seating surface 9 of the seat cushion 4 faces upward to support the buttocks of the occupant, and the support surface 12 of the seatback 5 faces substantially forward to support the back of the occupant. When the vehicle seat 1 is displaced from the use position to the stowed position, the seat cushion 4 is lifted at the rear end part thereof, and moved forward (the double-dot chain line in FIG. 2A), and the seating surface 9 is caused to face forward. At the same time, the seatback 5 is tilted forward by being rotated around the lower end thereof (the double-dot chain line in FIG. 2A) until the support surface 12 of the seatback 5 faces substantially downward and the back surface of the seatback 5 extends substantially horizontally. When the vehicle seat 1 is in the stowed position, the back surface of the seatback 5 is continuous with the surface of the cargo floor 7, and cargo can be placed on the back surface of the seatback 5. As shown in FIG. 2A, the headrest 6 may also rotate around an axial line extending in the lateral direction with respect to the seatback 5 so that the movement of the seatback 5 is not obstructed by the headrest 6 when the vehicle seat 1 is displaced from the use position to the stowed position.

In the present embodiment, a lever 17 is provided at an upper left end part of the seatback 5. When the lever 17 is operated with the vehicle seat 1 in the use position, the seatback 5 can be pivoted with respect to the seat cushion 4 so that the seat occupant can adjust the angle of the seatback 5 with respect to the seat cushion 4 so as to suit the build of the occupant.

The structure of the seatback 5 is now described in the following with reference to FIGS. 3 to 5. As shown in FIG. 5, the seatback 5 is provided with a seatback frame assembly 18 serving as a structural framework, a pad member 21 supported by the seatback frame assembly 18, a skin member 22 provided on the surface of the pad member 21 to form the outer surface of the seatback 5, and an airbag module 23 supported by the seatback frame assembly 18.

Figure 3:
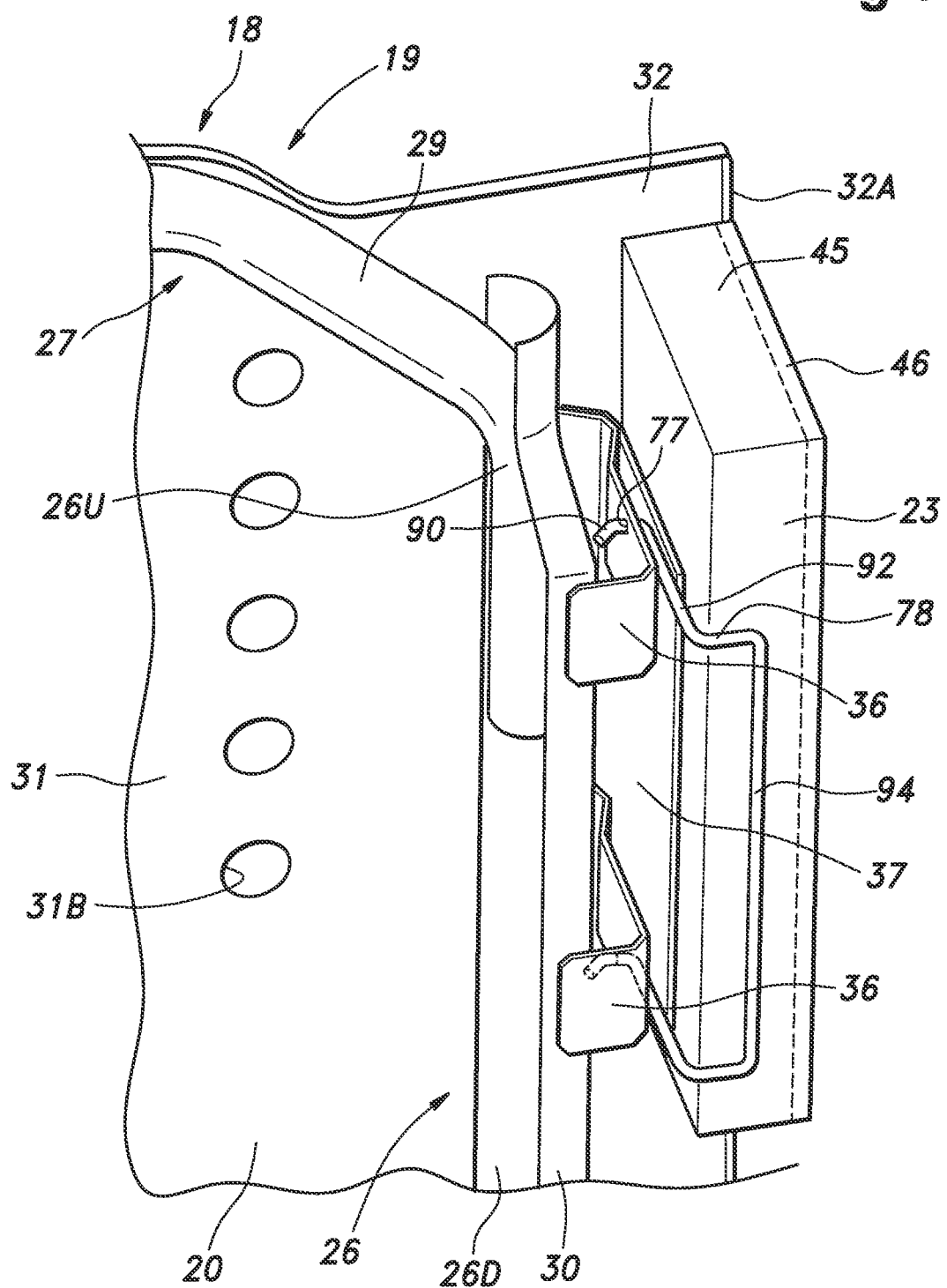
FIG. 3 is a perspective view of an upper part of a seatback frame of the vehicle seat of a first embodiment as seen from front.
Figure 4:
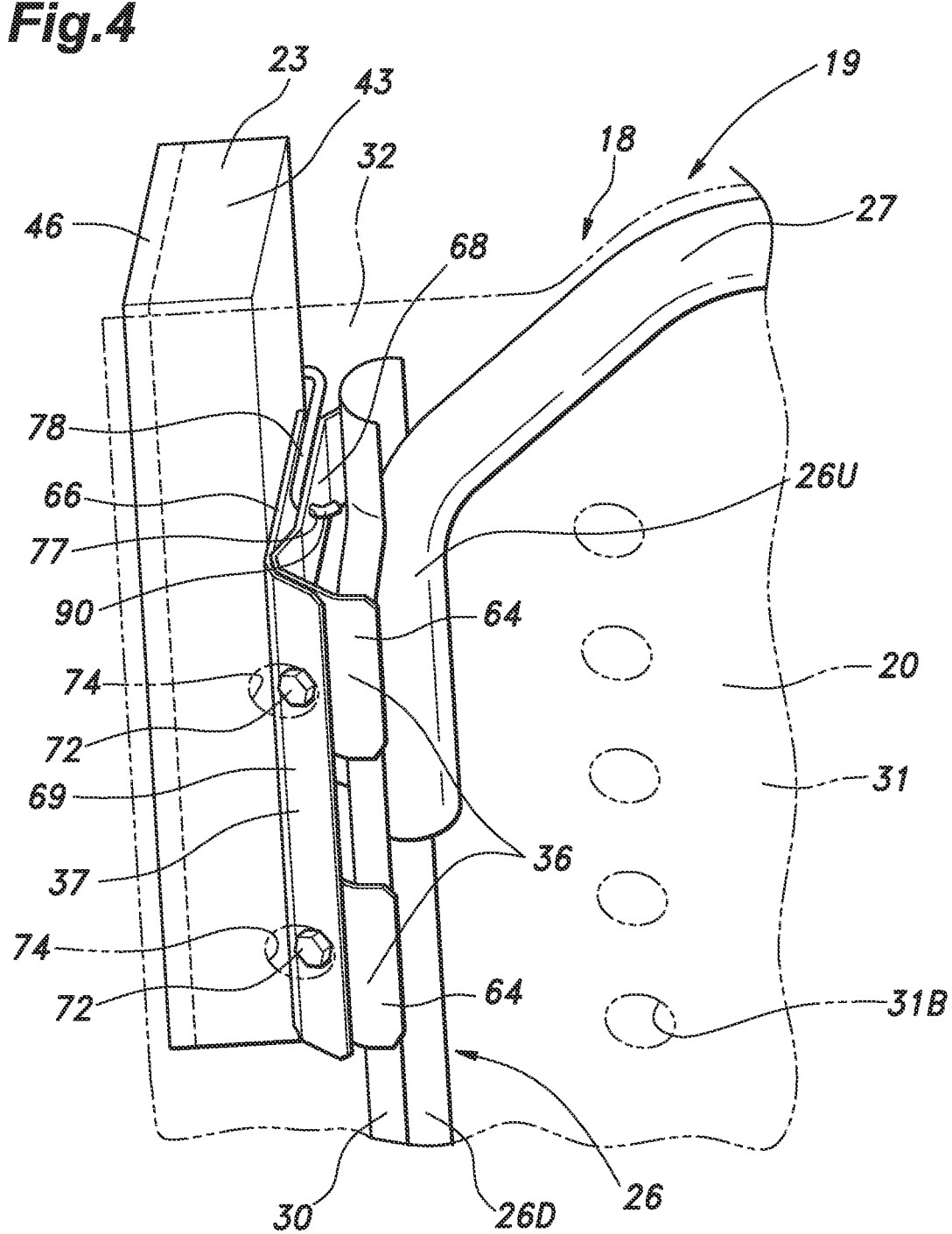
FIG. 4 is a perspective view of the upper part of the seatback frame of the vehicle seat of the first embodiment as seen from rear.
Figure 5:
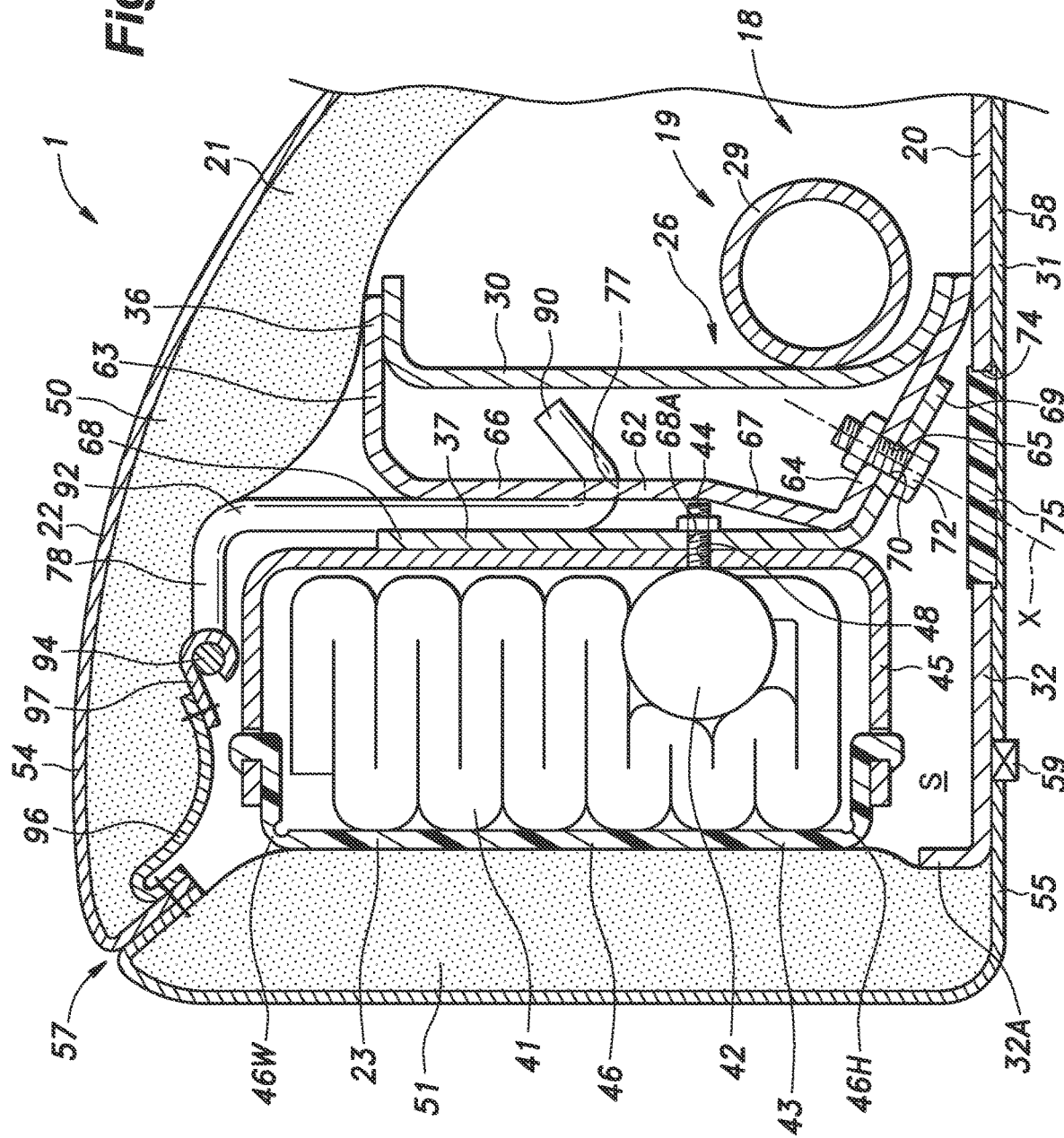
FIG. 5 is a sectional view taken along line V-V of FIG. 1.

As shown in FIGS. 3 and 4, the seatback frame assembly 18 forms a structural framework of the seatback 5, and includes a seatback frame main body 19 having a substantially rectangular frame configuration, and a pan frame 20 (plate member) positioned behind the seatback frame main body 19. The seatback frame main body 19 includes a pair of side frames 26 (side members) extending vertically along either side thereof, an upper frame 27 extending laterally between the upper ends of the left and right side frames 26, and a lower frame (not shown in the drawings) extending laterally between the lower ends of the side frames 26. The side frame upper portions 26U forming the upper parts of the respective side frames 26 and the upper frame 27 are formed by bending a single pipe member 29 having a circular cross section into an inverted U-shape or a gate shape. The side frame lower portions 26D forming the lower parts of the respective side frames 26 are formed by sheet metal members 30, respectively, each having a laterally facing major plane. The two ends of the pipe member 29 are welded to the respective ends of the sheet metal members 30 at the inwardly facing sides thereof. The front and rear edges of each sheet metal member 30 are bent inwardly with respect to the seat. The lower ends of the side frames 26 are pivotably connected to the frame structure forming the seat cushion 4 via a reclining mechanism.

The pan frame 20 is a sheet metal member extending along the rear side of the side frames 26 and the upper frame 27 and hence having a major plane facing in the fore and aft direction. The pan frame 20 includes a pan frame base portion 31 that covers the rear side of the side frames 26, the upper frame 27, and the lower frame, and a pan frame extension 32 that extends from the pan frame base portion 31 leftward (in the outboard direction) beyond the side frame 26 on the left side (outboard side). The pan frame 20 is welded to the upper frame 27 at the upper edge, welded to the lower frame at the lower edge, and welded to appropriate parts of side frames 26 at the respective side edges. A plurality of reinforcing beads and lightening holes 31B may be provided in appropriate parts of the pan frame base portion 31.

A pair of brackets 36 (first mounting members) are directly connected to the left side frame 26 one above the other. A single retainer 37 (second mounting member) that retains the airbag module 23 is directly connected to the two brackets 36. The airbag module 23 is thus connected to the side frame 26 via the retainer 37 and the brackets 36. The airbag module 23 has a substantially rectangular shape extending along the extending direction of the side frame 26, and has a pair of laterally facing outer surfaces.

As shown in FIG. 5, the airbag module 23 includes an inflator 42 that releases gas into an airbag 41 to inflate and deploy the airbag 41, and a substantially rectangular case 43 receiving the airbag 41 and the inflator 42 therein. The inflator 42 has a substantially cylindrical shape, and is provided with a male thread portion 44 that protrudes radially outward from the outer circumferential surface thereof.

The case 43 has a substantially rectangular shape, and includes a metal case body 45 having an open left side, and a plastic lid body 46 that covers the open end of the case body 45. The case body 45 thus includes a substantially rectangular bottom wall, and a side wall connected to the outer peripheral edge of the bottom wall. The bottom wall of the case body 45 is provided with a through hole 48 that is passed therethrough in the thickness direction at a predetermined position. The airbag 41 is folded and received in the case body 45.

The male thread portion 44 is passed into the through hole 48 from the inside of the case body 45, and the protrudes to the outside. The airbag module 23 is connected to the retainer 37 by fastening the male thread portion 44 to the retainer 37.

The lid body 46 has a substantially rectangular shape, and is formed as a plastic plate that faces in the lateral direction. In the present embodiment, the outer peripheral edge of the lid body 46 is provided with a tubular portion having a rectangular outer profile that protrudes toward the case body 45 and fits into the open end of the case body 45. A plurality of locking claws that protrude radially outward and arranged along the circumferential direction are formed on the outer peripheral surface of the tubular portion. A plurality of through holes are provided in the side wall of the case body 45, and the locking claws are engaged by these through holes, respectively, such that the lid body 46 is connected to the case body 45.

The lid body 46 is provided with a frangible portion 46W in the form of a groove extending along the front edge, upper and lower edges thereof, and a hinge 46H consisting of a thinned portion is provided along the rear edge thereof. As a result, when a leftward load is applied to the lid body 46, the lid body 46 is ripped at the frangible portion 46W so that the central portion of the lid body 46 rotates around the hinge 46H to open up the case body 45.

The pan frame extension 32 extends leftward beyond the left side frame 26, and reaches the left side of the left end of the airbag module 23. The pan frame extension 32 is spaced rearward from the airbag module 23 so that a clearance S is defined between the pan frame 20 and the airbag module 23 in the fore and aft direction. The left edge of the pan frame extension 32 is bent forward to form a bent portion 32A which is bent forward to increase the rigidity of the pan frame 20. In the present embodiment, as shown in FIG. 3, the upper edge of the pan frame 20 is also bent forward similarly as the left edge of the pan frame extension 32.

The pad member 21 is formed from a soft cushion material such as polyurethane foam. As shown in FIG. 5, the pad member 21 includes a front surface portion 50 located behind the support surface 12 and a left side surface portion 51 extending rearward from the left edge of the front surface portion 50. The front surface portion 50 and the left side surface portion 51 are each composed of a separate cushion member. The front surface portion 50 passes along the front side of the side frame 26, the bracket 36 and the retainer 37, and extends to the left front side of the airbag module 23. The left side surface portion 51 extends rearward from the left front part of the airbag module 23, passes through the left side of the airbag module 23, and reaches a rear end part that is substantially flush with the rear surface of the pan frame 20 with respect to the fore and aft direction.

The skin member 22 is formed by sewing together a plurality of sheet-like members such as cloth and leather. The skin member 22 has a front sheet material 54 that covers the surface of the front surface portion 50, and a left side sheet material 55 that covers the surface of the left side surface portion 51. The left edge of the front sheet material 54 and the front edge of the left side sheet material 55 are stitched together to form a stitched portion 57. The stitched portion 57 functions as a frangible portion of the skin member 22 that can be ripped apart with a smaller load than other stitched portions. As shown in FIG. 1, the stitched portion 57 extends vertically along the left front edge of the seatback 5.

The rear surface of the pan frame 20 is fitted with a back sheet material 58 formed of a sheet-like member such as cloth or leather similar to the material of the skin member 22. One end of the back sheet material 58 is connected to the rear edge of the left side sheet material 55 via a line fastener 59.

The vehicle seat 1 is provided with a sensor 60 at a predetermined position for detecting a load applied to the occupant in the rear seat. The sensor 60 may be, for example, a tension sensor that detects a tension applied to a seat belt worn by the occupant in the rear seat or an acceleration sensor that detects an acceleration applied to the vehicle seat 1. A control unit 61 is provided under the vehicle seat 1, and is electrically connected to the sensor 60 and the inflator 42 to control the operation of the inflator 42 according to the load detected by the sensor 60. In the present embodiment, the control unit 61 is provided on the vehicle seat 1, but may also be provided at any other position on the vehicle body.

Details of the shapes of the brackets 36 and the retainer 37 are described in the following. As shown in FIG. 3, the upper and lower brackets 36 each consist of a bent sheet metal member and are substantially identical in shape. Therefore, only the upper bracket 36 is described in detail, and the lower bracket 36 is omitted from the following description.

As shown in FIG. 5, the bracket 36 includes a substantially square plate-like bracket base 62 that faces substantially in the lateral direction, a bracket front wall 63 connected to the front edge of the bracket base 62, and a bracket slanted wall 64 connected the rear edge of the bracket base 62.

The bracket front wall 63 has a plate shape extending rightward from the front edge of the bracket base 62, and is welded to the front surface of the sheet metal member 30 forming the left side frame lower portion 26D.

As shown in FIG. 5, the bracket slanted wall 64 has a plate shape that is inclined rearward toward the right edge (inboard edge) thereof. The rear edge of the bracket slanted wall 64 is welded to the rear surface of the sheet metal member 30. The bracket slanted wall 64 is provided with a bolt hole 65 (fastening portion) passed therethrough in the thickness direction. A nut is welded to the front surface of the bracket slanted wall 64 at a position aligning with the bolt hole 65.

A front part of the bracket base 62 consists of a bracket engaging wall 66 that extends in the fore and aft and vertical directions in a part of the bracket base 62 located to the right the front edge of the bracket slanted wall 64. The rear edge of the bracket engaging wall 66 and the front edge of the bracket slanted wall 64 are connected to each other by a connecting wall 67 that inclines rightward toward the front edge thereof. The front edge of the bracket engaging wall 66 is connected to the bracket front wall 63.

The retainer 37 is a bent sheet metal member, and includes a plate-shaped retainer base 68 extending in the fore and aft and vertical directions, and a plate-shaped retainer slanted wall 69 that is connected to the rear edge of the retainer base 68 and slants to the right toward the rear edge thereof. The retainer base 68 is provided with a bolt hole 68A passed therethrough in the thickness direction. The airbag module 23 is retained on the left side surface of the retainer base 68 by fastening the male thread portion 44 of the inflator 42 to the bolt hole 68A.

A pair of bolt holes 70 are passed through retainer slanted wall 69 in the thickness direction. The retainer slanted wall 69 extends along the ear surfaces of the bracket slanted walls 64, and the retainer 37 is fastened to the brackets 36 by a pair of bolts 72 (fasteners) that are each passed through the corresponding bolt holes 65 and 70.

The pan frame 20 is provided with a pair of tool holes 74 for tightening the bolts 72. The tool holes 74 each consist of a through hole that is passed through the pan frame 20 in the thickness direction, and is provided on an extension line of the axial line X of the corresponding bolt 72 that is passed through the bolt holes 65 and 70. The tool holes 74 are dimensioned so as to allow a tool (for example, a universal wrench) for tightening the bolts 72 to be inserted. As shown in FIG. 5, the pan frame 20 is provided with a pair of closure members 75 that dose the respective tool holes 74.

The rear end of each bracket slanted wall 64 is in contact with the front surface of the pan frame 20. Accordingly, the brackets 36 are located between the side frame 26 and the pan frame 20.

As shown in FIG. 5, the bracket engaging walls 66 of the upper and lower brackets 36 are each provided with an engaging hole 77 passed therethrough in the thickness direction at a predetermined position. A wire member 78, consisting of a metal rod having a circular cross section and bent into a predetermined shape, is engaged to the engaging holes 77. As shown in FIG. 3, the wire member 78 is provided with a pair of hooks 90 located at the two ends thereof one above the other and engaged to the engaging holes 77, respectively, a pair of connecting portions 92 located one above the other and extending from the respective hooks 90 to the front end of the airbag module 23, and an engaging portion 94 extending vertically and connecting the front ends of the two connecting portions 92 to each other. The wire member 78 is connected to the brackets 36 by the hooks 90 provided at the respective ends of the wire member 78 and engaged to the engaging holes 77 of the respective brackets 36. The connecting portions 92 are connected to the respective hooks 90 at the rear ends thereof, extend through the space defined between the bracket engaging walls 66 and the retainer base 68, and reaches a right front side of the airbag module 23. The front ends of the connecting portions 92 are bent leftward. In the present embodiment, the connecting portions 92 are pushed against the bracket engaging walls 66 by the airbag module 23 in the space defined between the bracket engaging wall 66 and the retainer base 68. As a result, the wire member 78 is clamped between the brackets 36 and the retainer 37, and is thereby kept fixed in position.

The skin member 22 is provided with a webbing 96. The webbing 96 is formed of a sheet-like member that is less stretchable than the skin member 22. One end of the webbing 96 is stitched to the front sheet material 54 and the left side sheet material 55 at the stitched portion 57. The webbing 96 extends from the front end thereof between the front surface portion 50 and the left side surface portion 51 toward the engaging portion 94 of the wire member 78. A hook 97 is provided at the other end of the webbing 96, and is engaged to the engaging portion 94 of the wire member 78.

The mode of operation of the vehicle seat 1 is described in the following. When the sensor 60 (FIG. 1) detects that the load applied to the occupant in the rear seat has exceeded a predetermined value, the control unit 61 controls the inflator 42 so as to supply gas into the airbag 41. As a result, gas is released from the inflator 42 to inflate the airbag 41 with the result that the lid body 46 is pressed to the left. Thereby, the frangible portion 46W (FIG. 5) is ripped apart, and the case 43 is opened.

The airbag 41 is inflated in the leftward and forward direction by the gas supplied from the inflator 42, passes between the front surface portion 50 and the left side surface portion 51, and reaches the stitched portion 57. At this time, a load is applied to the webbing 96 due to the inflation of the airbag 41. Due to the load applied to the webbing 96, the stitched portion 57 is broken, and an opening is formed at an upper left end part of the front surface of the seatback 5. The airbag 41 is inflated to the left front of the seatback 5 through the opening, and is deployed between the seat occupant and the cabin side wall.

The effect of the vehicle seat 1 is described in the following. In the vehicle seat 1 including the airbag 41, when the airbag 41 is deployed, a load (reaction force) opposite to the deployment direction of the airbag 41 is applied to the seat frame that supports the airbag module 23. In order to correctly deploy the airbag 41 and to stabilize the deployment of the airbag 41, the frame that supports the airbag module 23 is required to have a rigidity that can sufficiently withstand the reaction force that is applied thereto when the airbag 41 is deployed.

The pan frame 20 is formed of a substantially flat sheet metal member that covers the rear surfaces of the left and right side frames 26. In order to connect the airbag module 23 to the pan frame 20 and to give the pan frame 20 a sufficient rigidity to counteract the reaction force applied thereto when the airbag 41 is deployed, it is necessary to increase the plate thickness of the pan frame 20. However, when the plate thickness of the pan frame 20 is increased, the weight of the seatback frame assembly 18 increases.

In the vehicle seat 1, the airbag module 23 is connected to the side frame 26. An upper part of the side frame 26 is formed by the pipe member 29. The lower portion of the side frame 26 is formed by the sheet metal member 30 that is bent at the front and rear edges thereof toward the inside of the sheet. Therefore, the side frame 26 has a higher rigidity than the plate-like pan frame 20. By connecting the airbag module 23 to the side frame 26, the plate thickness of the pan frame 20 can be reduced as compared with the case where the airbag module 23 is supported by the pan frame 20. Thus, the attitude of the airbag module 23 can be stabilized against the reaction force applied thereto when the airbag 41 is deployed, and the seatback 5 can be reduced in weight.

Further, by providing the airbag module 23 on the left side of the side frame 26, the airbag 41 can be inflated forward to be deployed between the vehicle seat 1 and the cabin side wall. Thereby, the seat occupant is prevented from colliding with the side wall of the cabin so that the safety of the seat occupant can be effectively enhanced.

Figure 2B:
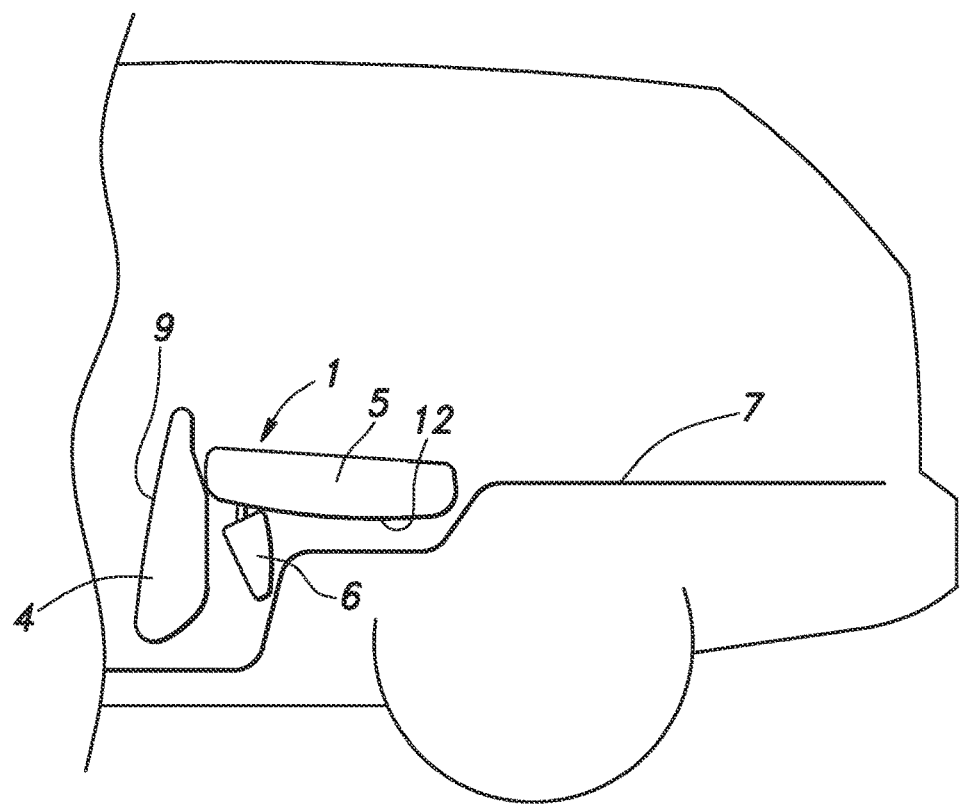
FIG. 2B shows an explanatory view of the vehicle seat showing the vehicle seat at the stowed position.

When the vehicle seat 1 is placed in the stowed position as shown in FIG. 2B, the back surface of the seatback 5 is continuous with the surface of the cargo floor 7 so that the area for placing the cargo or luggage can be expanded. To maximize such a cargo region, it is preferable to increase the size of the pan frame 20 as much as possible. Therefore, it is conceivable to extend the pan frame 20 to the left of the left side frame 26. However, when the pan frame 20 is increased in size, it becomes difficult to access the left side surface of the side frame 26 from the rear of the seatback 5 after the pad member 21 is installed on the front surface of the seatback frame assembly 18. For this reason, it becomes difficult to fasten the airbag module 23 to the side frame 26.

As shown in FIG. 5, the tool holes 74 are provided in the pan frame 20 of the vehicle seat 1 so that the tool can be inserted into the tool holes 74 from the rear of the pan frame 20, and the bolts 72 for fastening the retainer 37 to the brackets 36 can be tightened from the rear of the pan frame 20. Therefore, the airbag module 23 can be fastened to the side frame 26 from behind the seatback 5 with ease.

Figure 6:
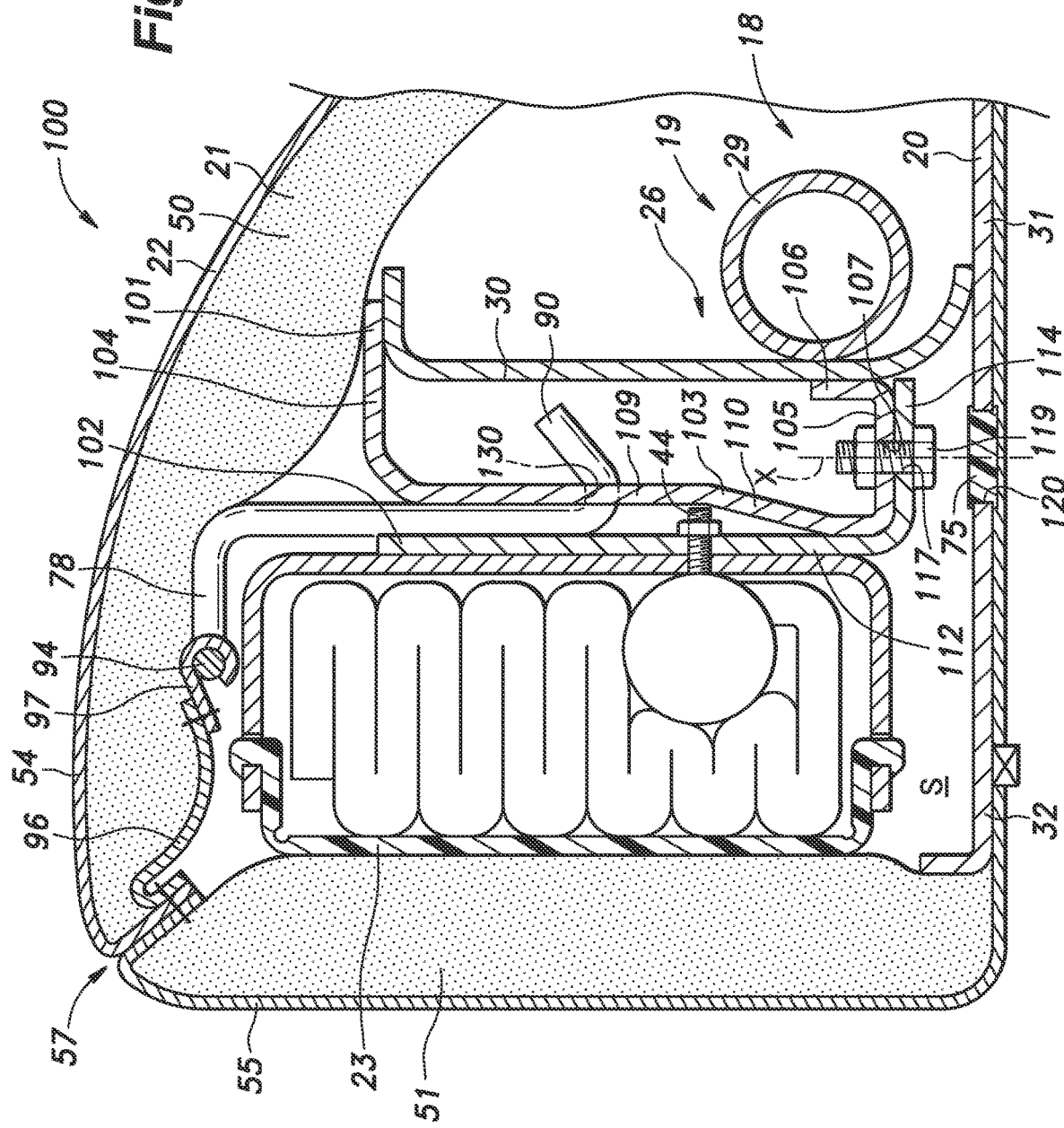
FIG. 6 is a sectional view of an upper part of a seatback of a vehicle seat according to a second embodiment of the present invention.

Further, in this embodiment, since the wall surface to which the bolts 72 are fastened is slanted from the lateral direction, the bends in the brackets 36 can be reduced in number and the wall surface having the fastening portion can be made clearly visible from the rear, as opposed to the case where the brackets 36 are each bent at two locations to form a wall surface facing rearward and the fastening portion is provided on this wall surface (for example, as shown FIG. 6). Therefore, the bolt holes 65 and 70 can be provided in parts that are clearly visible from the rear without reducing the rigidity of the brackets 36.

Compared with the case where the bolt 72 is fastened to the wall extending in the lateral direction, the amount of protrusion of the head of the bolt 72 toward the rear is smaller when the bolt 72 is fastened to the wall inclined with respect to the lateral direction. In the present embodiment, the amount of protrusion of the head of the bolt 72 to the rear can be reduced by inclining the bracket slanted wall 64 to which the bolt 72 is fastened relative to the lateral direction. Further, since the rear surface of the bracket slanted wall 64 faces obliquely rearward, the head of the bolt 72 can be visually recognized from the rear of the pan frame 20 so that the fastening operation of the retainer 37 and the brackets 36 is facilitated.

The pan frame 20 is provided with a pair of closure members 75 that close the tool holes 74. Therefore, the back surface of the seatback 5 can be made flatter, and the stability of the luggage placed on the back surface of the seatback 5 can be improved when the vehicle seat 1 is in the stowed position. Further, when the tool holes 74 are each closed by the closure member 75, even when a liquid such as moisture that may have originated from the luggage is applied to the back of the seatback 5 with the vehicle seat 1 in the stowed position, the liquid may be prevented from dripping onto and reaching the airbag module 23.

A clearance S is provided between the pan frame 20 and the airbag module 23. Therefore, the load from the luggage placed on the back surface of the seatback 5 is prevented from being directly applied to the airbag module 23 so that the change in the position of the airbag module 23 can be avoided.

The airbag module 23 is fastened to the retainer 37 in front of the bracket slanted wall 64 so that the deployed airbag 41 is prevented from contacting the bolts 72 that fasten the retainer 37 to the brackets 36, and deformation of the airbag 41 during deployment can be prevented. Thereby, the airbag 41 can be more reliably deployed.

In addition, the two brackets 36 are provided on the side frame 26 one above the other, and the airbag module 23 is connected to the side frames 26 at the two locations located one above the other. Therefore, as compared with the case where the airbag module 23 is connected to the side frame 26 at one location, the connection between the airbag module 23 and the side frame 26 is strengthened, and the attitude of the airbag 41 during deployment is more stabilized.

As shown in FIGS. 1 and 3, both the stitched portion 57 and the engaging portion 94 extend vertically, and the webbing 96 is engaged to the stitched portion 57 and the engaging portion 94 at the respective ends thereof. As a result, the webbing 96 forms a surface that extends vertically and laterally in front of the airbag module 23. Therefore, when the airbag 41 is inflated forward, a load is preferentially applied to the webbing 96, and the load due to the inflation of the airbag 41 can be more concentrated in the stitched portion 57.

As shown in FIG. 5, in this embodiment, since the rear end of the bracket slanted wall 64 is welded to the front surface of the pan frame 20, the airbag module 23 is connected to the pan frame 20 in addition to the side frame 26. Therefore, the airbag, 41 can be supported in a more stable manner.

Second Embodiment

A vehicle seat 100 according to the second embodiment is different from the first embodiment only in the shape of the brackets 101 and the shape of the retainer 102, and is otherwise similar to the first embodiment. Therefore, the details of the shape of the brackets 101 and the shape of the retainer 102 are described in detail in the following disclosure, and the other parts of the vehicle seat 100 are omitted from the description. Similarly to the first embodiment, the side frame 26 is provided with a pair of brackets 101 positioned one above the other, but since the lower bracket 101 is identical to the upper bracket 101, only the upper bracket 101 is described in detail.

As shown in FIG. 6, the bracket 101 of the second embodiment is a bent sheet metal member similarly as in the first 5 embodiment, and includes a bracket base 103 located to the left of the sheet metal member 30 so as to face in the lateral direction, a bracket front wall 104 consisting of a plate-like member extending rightward from the front edge of the bracket base 103 and welded to the front edge of the sheet metal member 30, and a bracket rear wall 105 consisting of a plate-like 10 member extending rightward from the rear edge of the bracket base 103 and welded to the left side surface of the sheet metal member 30. In this embodiment, the free end (right edge) of the bracket rear wall 105 is provided with a rearwardly extending flange 106. and the right edge of the bracket rear wall 105 is welded to the left side surface of the sheet metal member 30 at the flange 106. The bracket rear wall 105 is formed with a 15 bolt hole 107 (fastening portion) passed therethrough in the thickness direction (in the fore and aft direction). A nut is welded to a part of the front surface of the bracket rear wall 105 aligning with the bolt hole 107. A front part of the bracket base 103 is provided with a bracket engaging wall 109 facing laterally and extending in the fore and aft and vertical directions, similarly as in the first embodiment. The rear end of the 20 bracket engaging wall 109 and the left edge of the bracket rear wall 105 are connected to each other by a connecting wall 110 which slants rightward toward the front end thereof.

As in the first embodiment, the retainer 102 is a bent sheet metal member, and includes a substantially rectangular plate-like retainer base 112 extending substantially parallel to the side surface of the sheet metal member, and a retainer rear wall 114 (fastened portion) connected to the rear edge of the retainer base 112 and extending rightward. A bolt hole 117 is provided in the retainer rear wall 114. The retainer 102 is disposed such that the retainer rear wall 114 extends along the bracket rear walls 105, and is fastened to the rear surface of the bracket rear walls 105 by bolts 119 each passed through the two bolt holes 107 and 117.

Similarly to the first embodiment, the pan frame extension 32 is provided with a pair of tool holes 120 for accessing the heads of the bolts 119. The tool holes 120 each consist of a hole that is passed through the pan frame extension 32 on an extension line of the axial line X of the corresponding bolt 119 that is passed through the two bolt holes 107 and 117. In the present embodiment, the tool holes 120 are located behind the bolt holes 107 and 117. Moreover, the tool holes 120 are closed by closure members 75 similar to those of the first embodiment.

The airbag module 23 is fastened to the left side surface of the retainer base 112, and a clearance S is formed between the airbag module 23 and the pan frame extension 32.

As in the first embodiment, each bracket base 103 is provided with an engaging hole 130, and the corresponding end of the wire member 78 is engaged to the engaging hole 130. The wire member 78 is interposed between the bracket engaging wall 109 and the retainer base 112 at the rear part thereof, and includes an engaging portion 94 that extends vertically at the front part thereof. Further, similarly to the first embodiment, a webbing 96 having one end stitched to the stitched portion 57 and the other end engaging to the engaging portion 94 is provided.

The effect of the vehicle seat 100 configured as described above is discussed in the following. By inserting a tool into the tool hole 120 from the rear to the front of the pan frame 20, the bolt 119 can be easily accessed. As a result, the bracket 101 and the retainer 102 can be fastened by tightening the bolt 119. In particular, in the vehicle seat 100 according to the second embodiment, since the bolt hole 107 is formed in the bracket rear wall 105 facing the fore and aft direction, the tool insertion direction is directed in the forward direction so that the tool insertion direction is clearly recognizable for the worker.

Third Embodiment

A vehicle seat 200 according to the third embodiment is different from the first embodiment and the second embodiment only in the shape of the brackets 201 and the shape of the retainer 202, and is otherwise similar to the first embodiment. Therefore, the details of the shape of the brackets 201 and the shape of the retainer 202 are described in detail in the following disclosure, and the other parts of the vehicle seat 200 are omitted from the description. Similarly to the first embodiment, the side frame 26 is provided with a pair of brackets 201 positioned one above the other, but since the lower bracket 201 is identical to the upper bracket 201, only the upper bracket 201 is described in detail.

Figure 7:
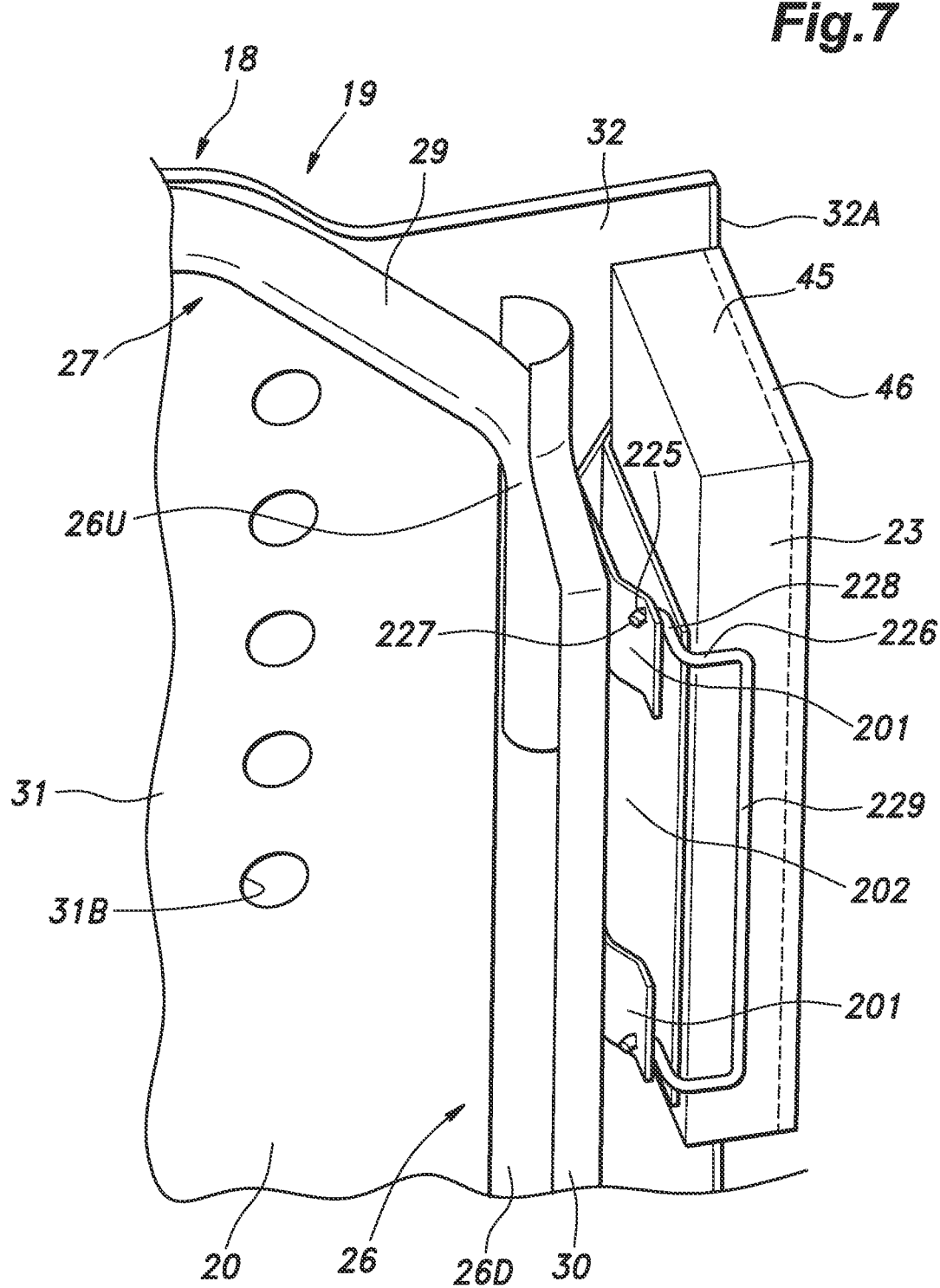
FIG. 7 is a perspective view of an upper part of a seatback of a vehicle seat according to a third embodiment of the present invention.

As shown in FIG. 7, the bracket 201 is a bent sheet metal member, and includes a connecting portion 203 welded to the left side surface of the sheet metal member 30, a bracket front portion 204 connected to the front edge of the connecting portion 203, and a bracket rear portion 205 connected to the rear edge of the connecting portion 203. The connecting portion 203 has a substantially rectangular plate shape having a surface facing the lateral direction along the left side surface of the sheet metal member 30. The right side surface of the connecting portion 203 is welded to the left side surface of the sheet metal member 30.

The bracket front portion 204 is connected to the front edge of the connecting portion 203 at the rear end, inclines forward toward the left end thereof before being bent forward. A plate-like bracket engaging wall 206 is formed at the front end of the bracket front portion 204 so as to face in the lateral direction and extend in the fore and aft and vertical directions.

The bracket rear portion 205 includes a bracket slanted wall 207 connected to the rear edge of the connecting portion 203 at the front end, and an abutting portion 208 connected to the rear edge of the bracket slanted wall 207. The bracket slanted wall 207 is inclined leftward toward the rear end thereof. The bracket slanted wall 207 is in contact with the front surface of the pan frame extension 32 at the rear end. As a result, the bracket 201 is positioned between the side frame 26 and the pan frame 20, and the bracket slanted wall 207 has a rear surface facing obliquely rearward. The bracket slanted wall 207 is provided with a bolt hole 209 passed therethrough in the thickness direction.

The abutting portion 208 extends to the left along the front surface of the pan frame extension 32. The abutting portion 208 abuts against the front surface of the pan frame extension 32 at the rear surface thereof, and is welded to the front surface of the pan frame extension 32 at the rear surface. The left end of the abutting portion 208 abuts against the right side surface of the bent portion 32A of the pan frame extension 32, and is welded to the right side surface of the bent portion 32A at the same end portion. As a result, the pan frame extension 32 extends leftward from the abutting portion 208, and has the bent portion 32A that is bent forward along the left end surface of the abutting portion 208 at the left edge thereof.

The retainer 202 is a bent sheet metal member, and includes a plate-like retainer base 211 that extends in the fore and aft and vertical directions, and a plate-like slanted wall 212 (fastened portion) that is connected to the rear edge of the retainer base 211, and slants rearward toward the left end thereof.

The retainer base 211 is provided with a bolt hole 213 at a prescribed location thereof, and the male thread portion 44 is fastened to the bolt hole 213. As a result, the airbag module 23 is connected to the left side surface of the retainer base 211, and is retained by the retainer 202.

The retainer slanted wall 212 is substantially parallel to the bracket slanted wall 207, and extends along the front surface of the bracket slanted wall 207. A bolt hole 214 is provided in the retainer slanted wall 212. A nut is welded the front surface of the bracket slanted wall 207 at a position aligning with the bolt hole 214. The bracket 201 and the retainer 202 are fastened by a bolt 216 (fastener) that is passed through the two bolt holes 209 and 214. Thus, the airbag module 23 is retained by the retainer 202, and supported by the side frame 26. As shown in FIG. 7, the airbag module 23 is positioned in front of the pan frame extension 32, and a clearance S is formed between the airbag module 23 and the pan frame extension 32.

The pan frame extension 32 is provided with a pair of tool holes 220 for inserting a tool from behind the pan frame 20 and tightening the bolts 216. The tool holes 220 are passed through the pan frame extension 32, and are provided on an extension line of the axial line X of the respective bolts 216. The tool holes 220 are dimensioned so as to allow a tool (for example, a universal wrench) for tightening the bolts 216 to be inserted. A plastic closure member 75 is press-fitted into each tool hole 220 to close the tool hole 220.

The bracket engaging walls 206 of each bracket 201 is formed with an engaging hole 225 passed therethrough in the thickness direction at a predetermined position. A wire member 226 formed by bending a metal rod having a circular cross section is connected to the engaging hole 225. The wire member 226 is provided with a pair of hooks 227 formed at the two ends thereof and engaged to the respective hook engaging holes 225, connecting portions 228 extending forward from the respective hooks 227, and an engaging portion 229 connected between the free ends of the upper and lower connecting portions 228, respectively. Each connecting portion 228 extends forward between the bracket front portion 204 and the retainer base 211, and reaches the right front of the airbag module 23 before being bent leftward. In the present embodiment, each connecting portion 228 is pressed against the bracket engaging wall 206 by the airbag module 23 in the space defined between the bracket front portion 204 and the retainer base 211. Thereby, the wire member 226 is clamped by the bracket 201 and the retainer 202 so as to be kept fixed in position.

The skin member 22 is provided with a webbing 96. The webbing 96 is formed of a sheet-like member that is less stretchable than the skin member 22. One end of the webbing 96 is stitched to the front sheet material 54 and the left side sheet material 55 at the stitched portion 57. The webbing 96 is passed through the boundary between the front surface portion 50 and the left side surface portion 51 as it extends from the one end thereof, and reaches the engaging portion 229 of the wire member 226. A predetermined hook 97 is provided at the other end of the webbing 96, and is engaged to the engaging portion 229 of the wire member 226.

The effect of the vehicle seat 200 according to the third embodiment is discussed in the following. Each bracket 201 is welded to the sheet metal member 30 at the connecting portion 203, and welded to the pan frame 20 at the abutting portion 208. The airbag module 23 is fastened to the retainer 202, and the retainer 202 is fastened to the brackets 201. Thereby, since the airbag module 23 is supported by the side frame 26 and the pan frame 20, the attitude of the airbag 41 at the time of deployment can be further stabilized.

The side frame 26 is provided with the brackets 201 positioned one above the other, and the airbag module 23 is connected to the side frame 26 at two locations located one above the other. Thereby, compared with the case where the airbag module 23 is connected to the side frame 26 at one location, the connection between the airbag module 23 and the side frame 26 is strengthened, and the attitude of the airbag 41 during deployment is more stabilized.

As shown in FIG. 1 and FIG. 7, both the stitched portion 57 and the engaging portion 229 extend vertically, and the webbing 96 is engaged to the stitched portion 57 and the engaging portion 229 at the respective end portions thereof. As a result, the webbing 96 defines a surface that extends vertically and horizontally in front of the airbag module 23. Therefore, when the airbag 41 is inflated forward, a load is preferentially applied to the webbing 96 so that the load due to the inflation of the airbag can be concentrated to the stitched portion 57.

Figure 8:
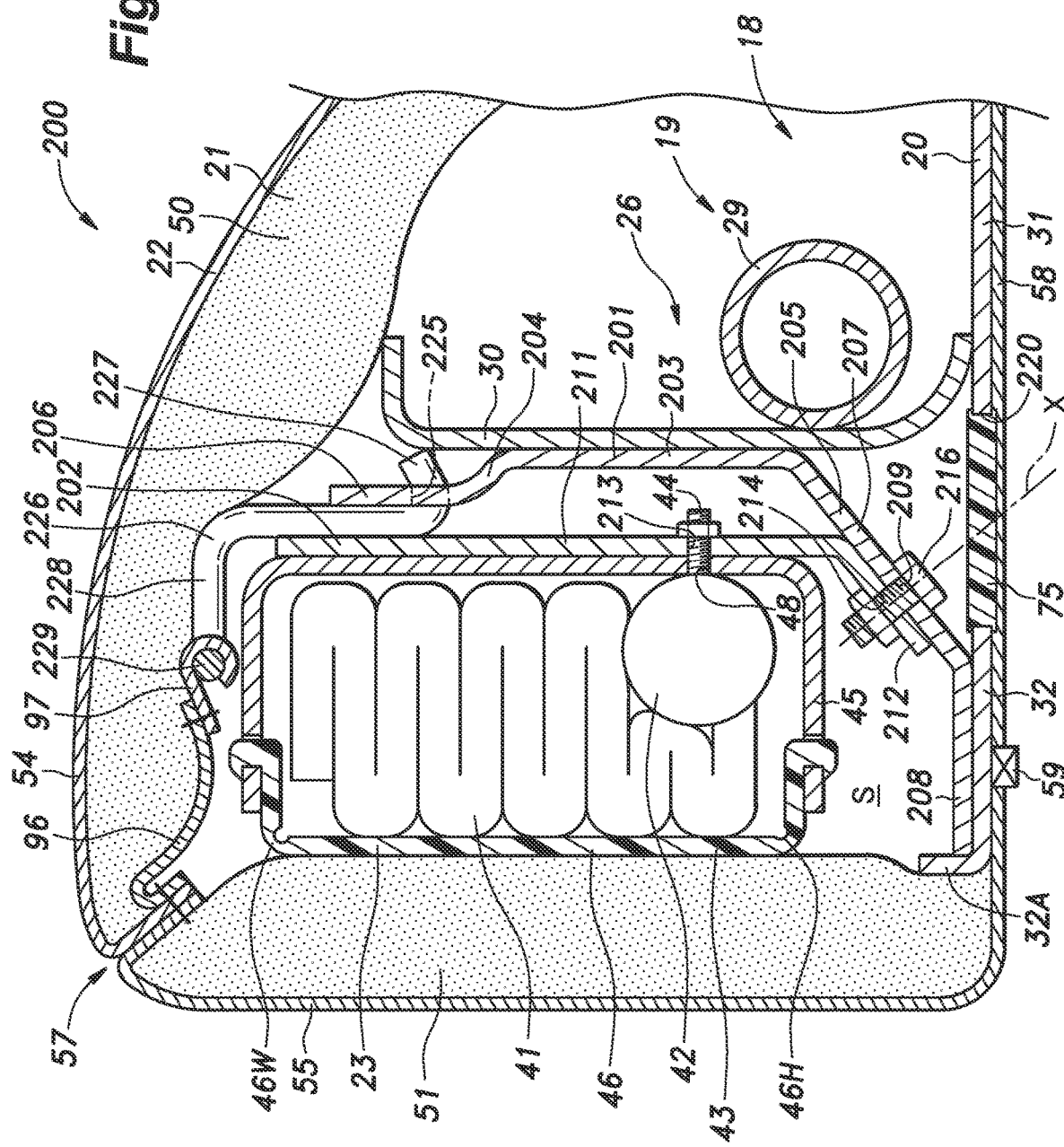
FIG. 8 is a sectional view of an upper left part of the seatback of the vehicle seat of the third embodiment.

As shown in FIG. 8, each bracket 201 is welded to the sheet metal member 30 at the connecting portion 203, and welded to the pan frame 20 at the abutting portion 208. The airbag module 23 is fastened to the retainer 202, and the retainer 202 is fastened to the brackets 201. Thereby, since the airbag module is supported by the side frame 26 and the pan frame 20, the attitude of the airbag 41 at the time of deployment can be further stabilized.

Further, the pan frame extension 32 can be reinforced by connecting the abutting portion 208 to the front surface of the pan frame extension 32. Thus, the pan frame extension 32 can be provided with a sufficient rigidity that can withstand the backward load applied thereto when the airbag 41 deployed. Further, even when a cargo is placed on the back surface of the seatback 5 and the resulting load is applied to the pan frame extension 32 on the rear surface side, the pan frame extension 32 can have a sufficient rigidity so that deformation of the pan frame extension 32 can be avoided.

Further, since the abutting portion 208 has a plate shape extending along the front surface of the pan frame extension 32, a sufficient contact area can be ensured between the abutting portion 208 and the pan frame extension 32. Accordingly, the pan frame extension 32 can be more reliably reinforced by the abutting portion 208. Further, since the abutting portion 208 and the pan frame extension 32 are welded to each other, the connection between the abutting portion 208 and the pan frame extension 32 is strengthened so that the pan frame extension 32 can be reinforced by the abutting portion 208 in a more reliable manner.

Moreover, the rigidity of the pan frame 20 can be increased by providing the bent portion 32A in the pan frame 20. Since the abutting portion 208 extends to the right side surface of the bent portion 32A, no clearance is defined between the abutting portion 208 and the bent portion 32A. Therefore, the vicinity of the left edge of the pan frame extension 32 can be more reliably reinforced by the abutting portion 208, and deformation of the part of the pan frame 20 near the left edge thereof can be more reliably prevented.

Fourth Embodiment

A vehicle seat 300 according to the fourth embodiment differs from that of the first embodiment in the shape of the side frame 301, the shape of the brackets 302, the shape of the retainer 303, and the shape of the wire member 304. The structures similar to those of the first embodiment are omitted from the following description. Similarly to the first embodiment, the side frame 301 is provided with a pair of brackets 302 positioned one above the other, but since the lower bracket 302 is identical to the upper bracket 302, only the upper bracket 302 is described in detail.

Figure 9:
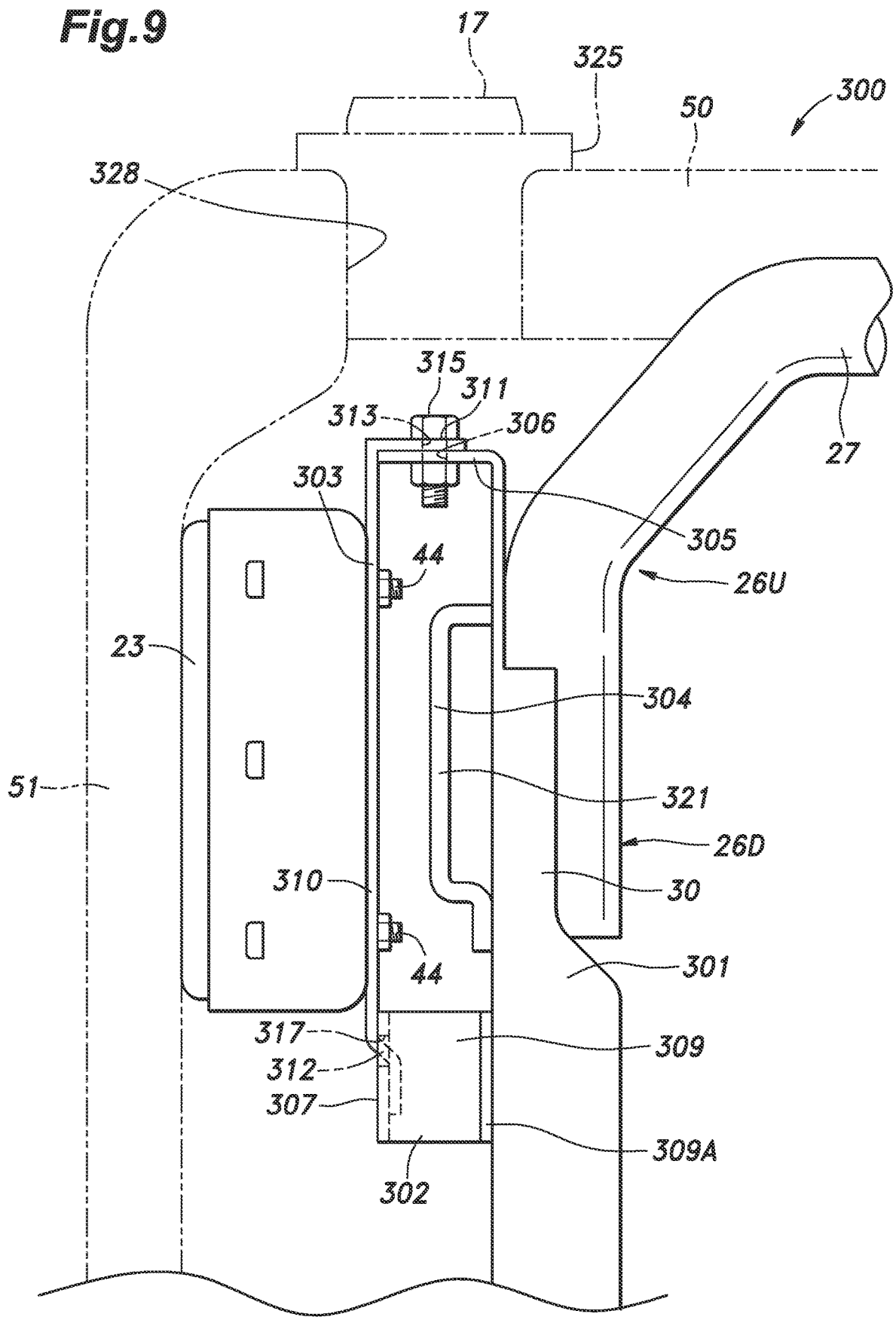
FIG. 9 is a rear view of an upper part of a seatback frame of a vehicle seat according to a fourth embodiment of the present invention.
Figure 10:
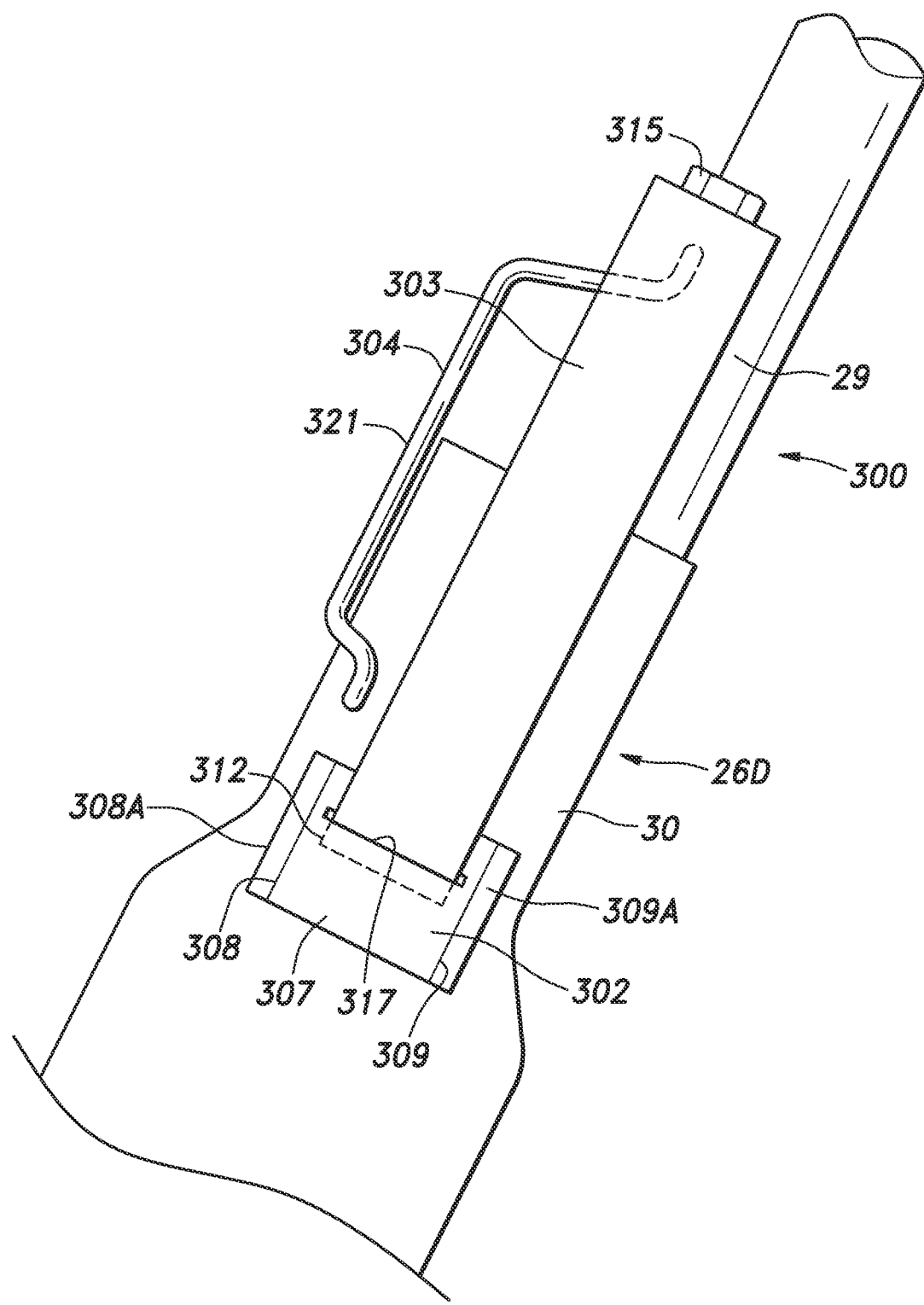
FIG. 10 is a side of the upper part of the seatback frame of the vehicle seat of the fourth embodiment.

As shown in FIGS. 9 and 10, the side frame 301 is different from the first embodiment in that an extension wall 305 (extending piece) extends leftward from an upper end part of the side frame 301. The extension wall 305 has a shape of a plate extending substantially horizontally, and hence having a surface facing in the vertical direction. The extension wall 305 is provided with a bolt hole 306 passed therethrough in the vertical direction. In the present embodiment, the extension wall 305 is formed by a part of the sheet metal member 30 forming the side frame lower portion 26D that extends upward at a substantially middle part thereof with respect to the fore and aft direction, and bent leftward at the upper end thereof.

A bracket 302 is located under the extension wall 305, and is connected to the left side surface of the sheet metal member 30. The bracket 302 includes a plate-like bracket base 307 extending in the fore and aft and vertical directions, and having a surface facing in the lateral direction, a bracket front portion 308 extending rightward from the front edge of the bracket base 307, and a bracket rear part 309 extending rightward from the rear edge of the bracket base 307. The bracket front portion 308 has a flange 308A extending forward at the right end, and is welded to the left side surface of the sheet metal member 30 at this flange 308A. The bracket rear part 309 has a flange 309A extending rearward at the tight end, and is welded to the left side surface of the sheet metal member 30 at this flange 309A.

The retainer 303 is a bent sheet metal member, and includes a plate-like retainer base 310 having a surface facing in the lateral direction and extending in the extending direction of the side frame 26, a retainer upper wall 311 (upper wall piece) extending rightward from the upper end of the retainer base 310 along the upper surface of the extension wall 305, and a retainer engaging portion 312 connected to the lower end of the retainer base 310.

The retainer upper wall 311 is located above the extension wall 305, and is in contact with the upper surface of the extension wall 305 at the lower surface thereof. A bolt hole 313 is provided in the retainer upper wall 311. A nut is welded to the lower surface of the extension wall 305 at a position aligning with the bolt hole 306, and the retainer upper wall 311 and the extension wall 305 are fastened to each other by using a bolt 315 that is passed through the two bolt holes 306 and 313.

Figure 12:
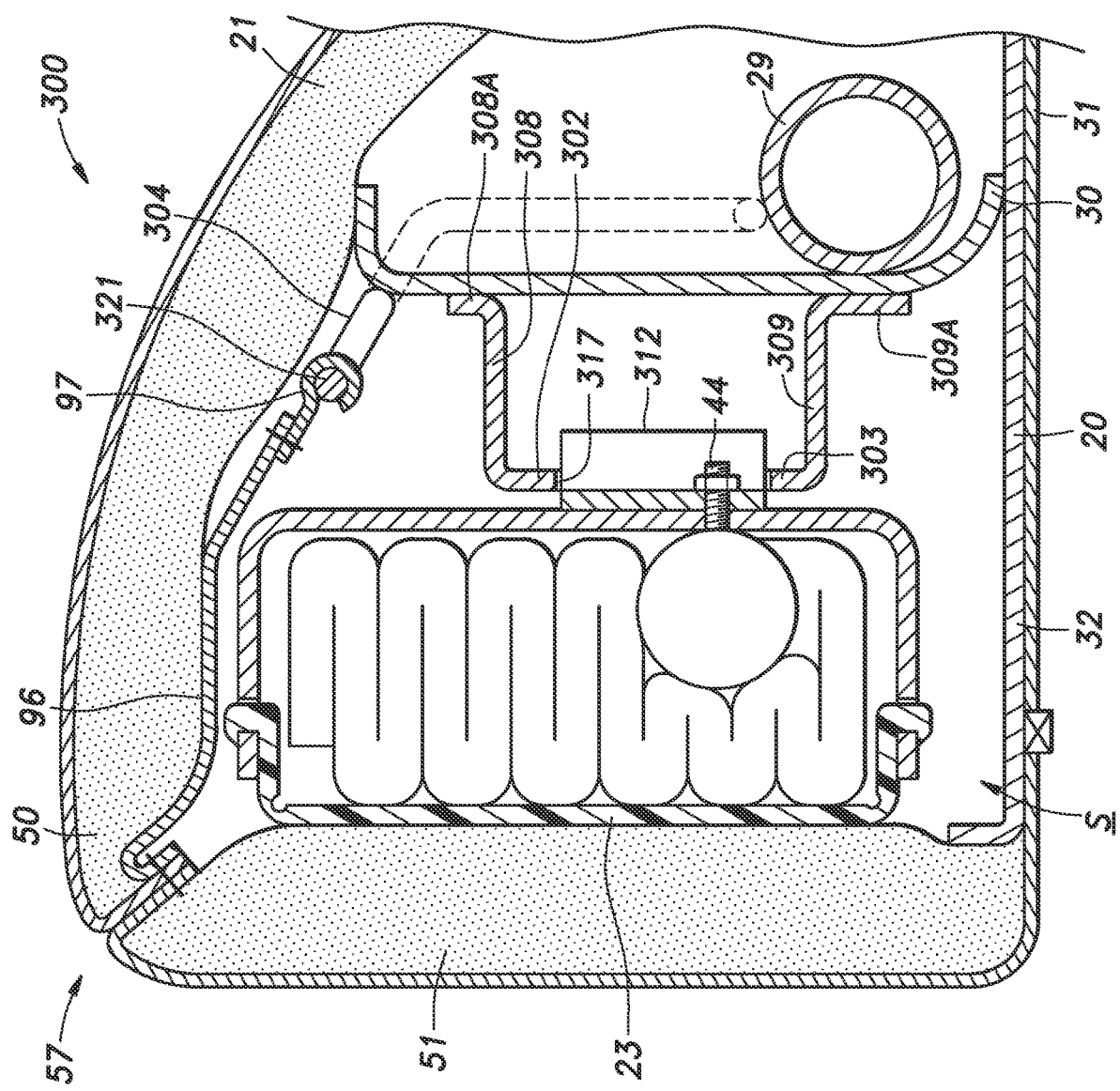
FIG. 12 is a sectional view of an upper left part of the seatback frame of the vehicle seat of the fourth embodiment.

The retainer engaging portion 312 has a plate shape extending rightward from the lower end of the retainer base 310, and then extending downward. As shown in FIGS. 10 and 12, the bracket base 307 is provided with a bracket engaging hole 317 (engaging portion) passed therethrough in the thickness direction at a position corresponding to the retainer base 310. The lower end of the retainer engaging portion 312 is passed into the bracket engaging hole 317, and extends in a lower right direction before reaching the right side of the bracket base 307. As a result, the lower end of the retainer 303 is engaged to the bracket 302.

Figure 11:
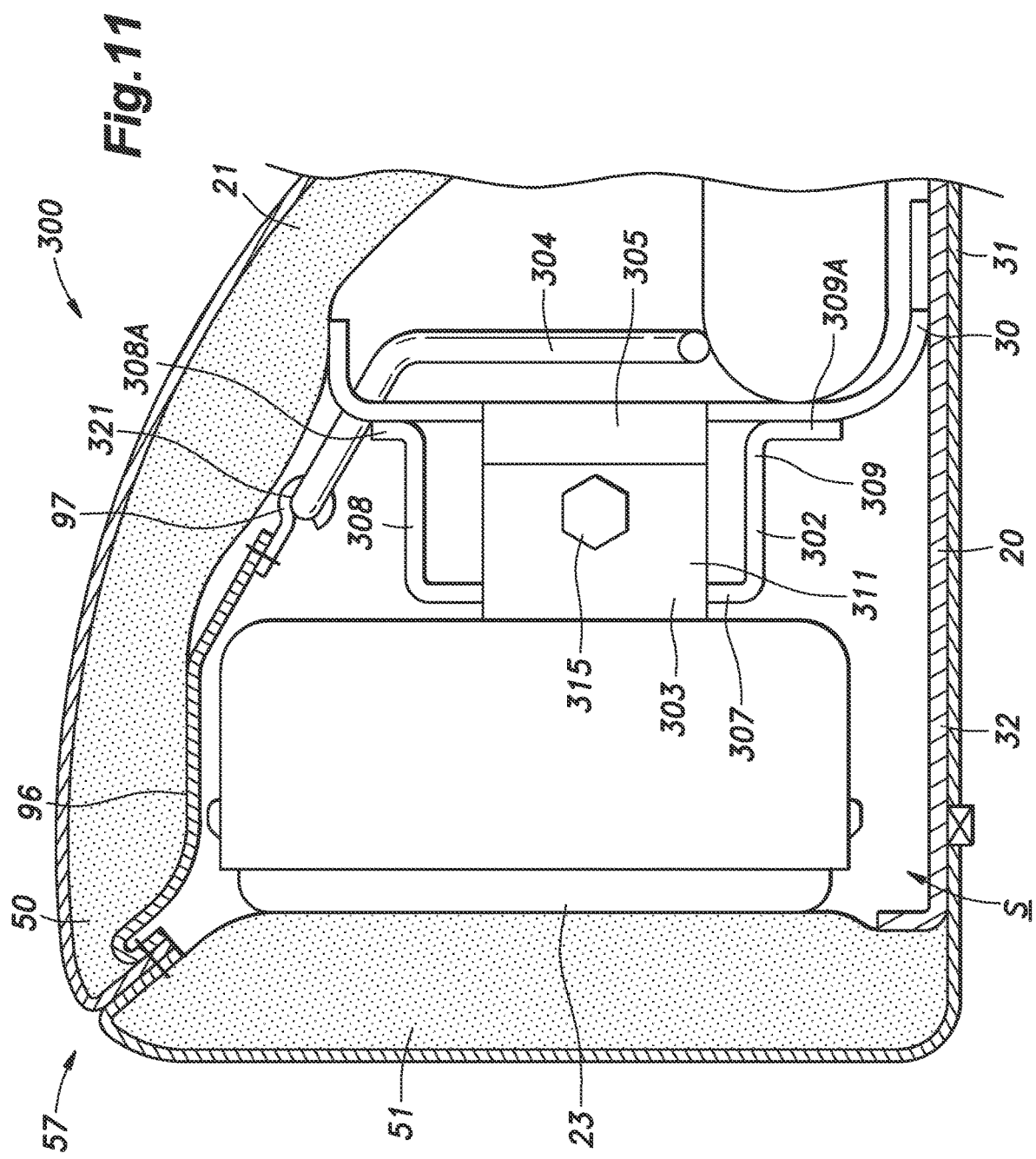
FIG. 11 is a sectional view of an upper left end part of the seatback frame of the vehicle seat of the fourth embodiment.

The retainer base 310 is provided with a through hole. The airbag module 23 is fastened to the left side surface of the retainer base 310 such that the airbag module 23 extends along the left side surface of the retainer base 310 and the male thread portion 44 is passed through the through hole. In this conjunction, as shown in FIG. 11, the airbag module 23 is positioned in front of the pan frame extension 32, and a clearance S is defined between the airbag module 23 and the pan frame extension 32.

The wire member 304 is a bent metal rod member, and is connected to the left side frame 26 at the two ends thereof. A central part of the wire member 304 is provided with a wire engaging portion 321 that extends along the extending direction (vertical direction) of the side frame 26. In the present embodiment, the wire member 304 is welded to the sheet metal member 30 at the both ends thereof, and the wire engaging portion 321 is located in front of a bracket front portion 308, to the right of the airbag module 23, and to the left of the side frame 26. Similarly as in the first embodiment, one end of a webbing 96 is stitched to a stitched portion 57, and the other end of the webbing 96 is engaged to the wire engaging portion 321 by using a hook 97.

As shown in FIG. 9, an operation member 325 including a lever 17 for adjusting the rotational angle of the seatback 5 with respect to the seat cushion 4 is provided at the upper left end of the seatback 5. The operation member 325 is connected to the reclining mechanism by a wire (not shown in the drawings), and performs the function of transmitting an input provided by the occupant by manipulating the lever 17 to the reclining mechanism. The pad member 21 that covers the upper surface of the seatback 5 is formed with a passage 328 extending vertically at a position corresponding to the operation member 325. In the present embodiment, the passage 328 is formed between the front surface portion 50 and the left side surface portion 51. The lower end of the operation member 325 is inserted into the passage 328, and the extension wall 305 is positioned under the operation member 325.

The effect of the vehicle seat 300 according to the fourth embodiment is discussed in the following. In this vehicle seat 300, as in the first embodiment, the airbag module 23 is positioned in front of the pan frame extension 32, and a clearance S is provided between the airbag module 23 and the pan frame extension 32. Thereby, the load applied to the back surface of the seatback 5 is prevented from being readily transmitted to the airbag module 23.

The extension wall 305 and the retainer upper wall 311 are fastened to each other by tightening the bolt 315 downward. The fastening work for tightening the bolt 315 can be performed by inserting a tool downward into the seatback 5 from above. Thereby, the fastening operation is not hindered by the pan frame 20, and the assembly of the airbag module 23 is facilitated.

Further, the pad member 21 is formed with the passage 328 that extends from above, and reaches the extension wall 305. Therefore, it is not necessary to provide a separate passage in the pad member 21 for allowing the access to a tool so that the structure of the vehicle seat 300 can be simplified.

The retainer 303 is fastened to the side frame 26 at the upper part thereof, and is engaged by the bracket engaging hole 317 at the lower part thereof. The retainer 303 is thus connected to the side frame 26 at both the upper part and the lower part thereof so that the retainer 303 and the side frame 26 are more firmly connected to each other than when the retainer 303 is connected to the side frame 26 only at one of the upper part and the lower part. Therefore, the connection between the airbag module 23 and the side frame 26 can be made so firm that the attitude of the airbag 41 at the time of deployment can be stabilized.

Fifth Embodiment

A vehicle seat 400 according to the fifth embodiment of the present invention is different from the first embodiment in the shapes of the brackets 401, the pan frame 402, and the retainer 403, and is otherwise similar to that of the first embodiment. Therefore, the details of the shapes of the bracket 401, the pan frame 402, and the retainer 403 are described in detail in the following disclosure, and the other parts of the vehicle seat 400 are omitted from the description. Similarly to the first embodiment, the side frame 26 is provided with a pair of brackets 401 positioned one above the other, but since the lower bracket 401 is identical to the upper bracket 401, only the upper bracket 401 is described in detail.

Figure 13:
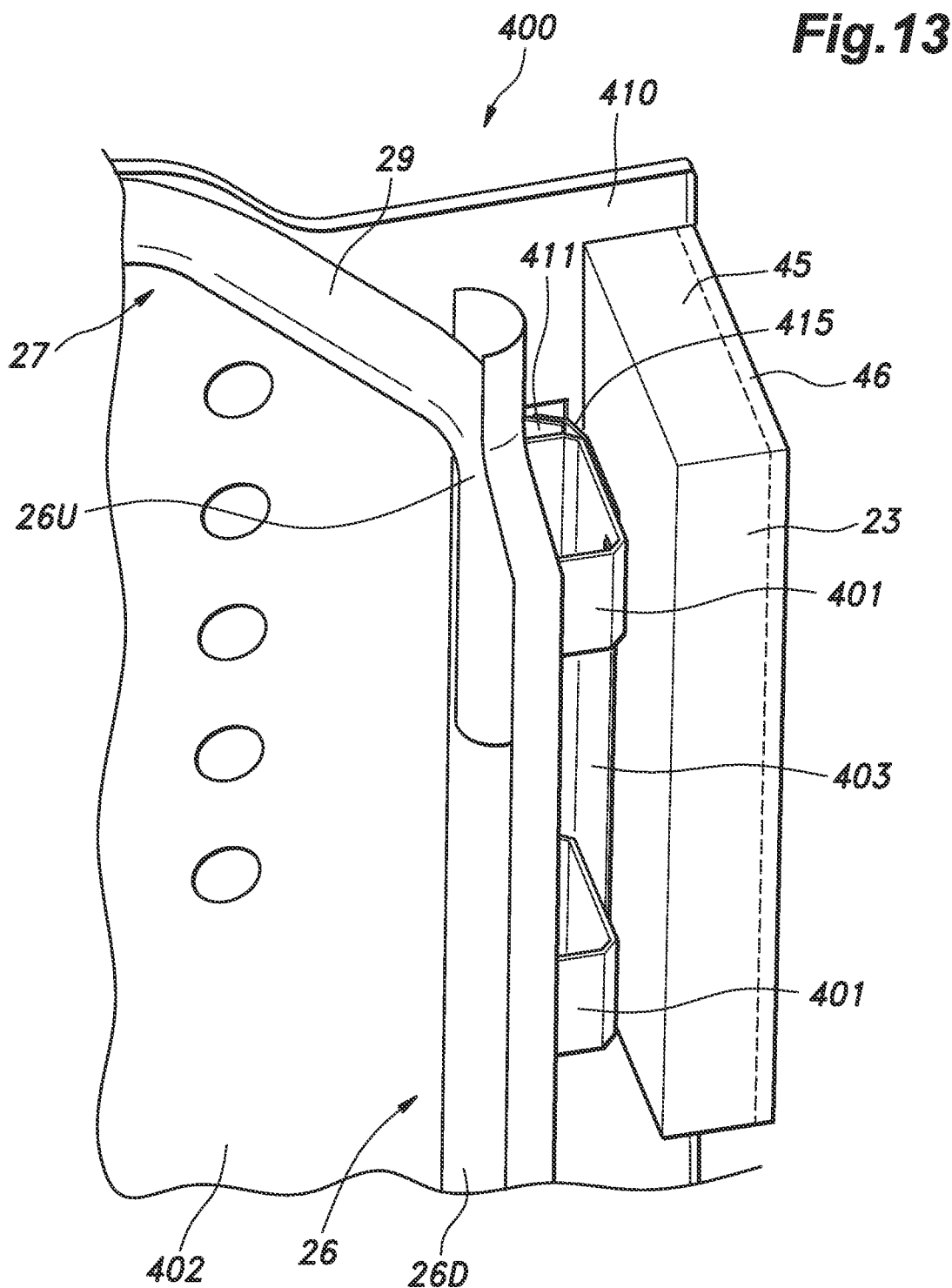
FIG. 13 is a perspective view of an upper part of a seatback of a vehicle seat according to a fifth embodiment of the present invention.

As shown in FIG. 13, the bracket 401 includes a substantially square plate-like bracket base 405 having a surface facing in the lateral direction and extending in the fore and aft and vertical directions, and a bracket front wall 406 extending rightward from the front edge of the bracket base 405, and a bracket rear wall 407 extending rightward from the rear edge of the bracket base 405. A flange 406A extends forward from the right edge of the bracket front wall 406, and the bracket front wall 406 is welded to the left side surface of the sheet metal member 30 at the flange 406A. A flange 407A extends rearward from the right edge of the bracket rear wall 407, and the bracket rear wall 407 is welded to the left side surface of the sheet metal member 30 at the flange 407A. The bracket base 405 is provided with a bracket engaging hole 408 passed therethrough in the thickness direction at a predetermined position.

Similarly to the first embodiment, the pan frame 402 includes a pan frame extension 410 that extends to the left of the left side frame 26. The pan frame extension 410 is provided with a raised piece 411 which is formed by cutting the material of the plate member forming the pan frame extension 410 in a rear end part of the bracket 401 in a U-shape having the open side facing rightward, and lifting the piece defined by the cut in the forward direction. The raised piece 411 has a plate shape having a major plane which is tilted forward toward the outboard end part thereof. The raised piece 411 has a substantially square shape having an upper edge, a lower edge, and a left edge, and is connected to the base material of the pan frame 402 along the right end thereof. The raised piece 411 is provided with a bolt hole 412 passed therethrough in the thickness direction at a predetermined position.

Figure 14:
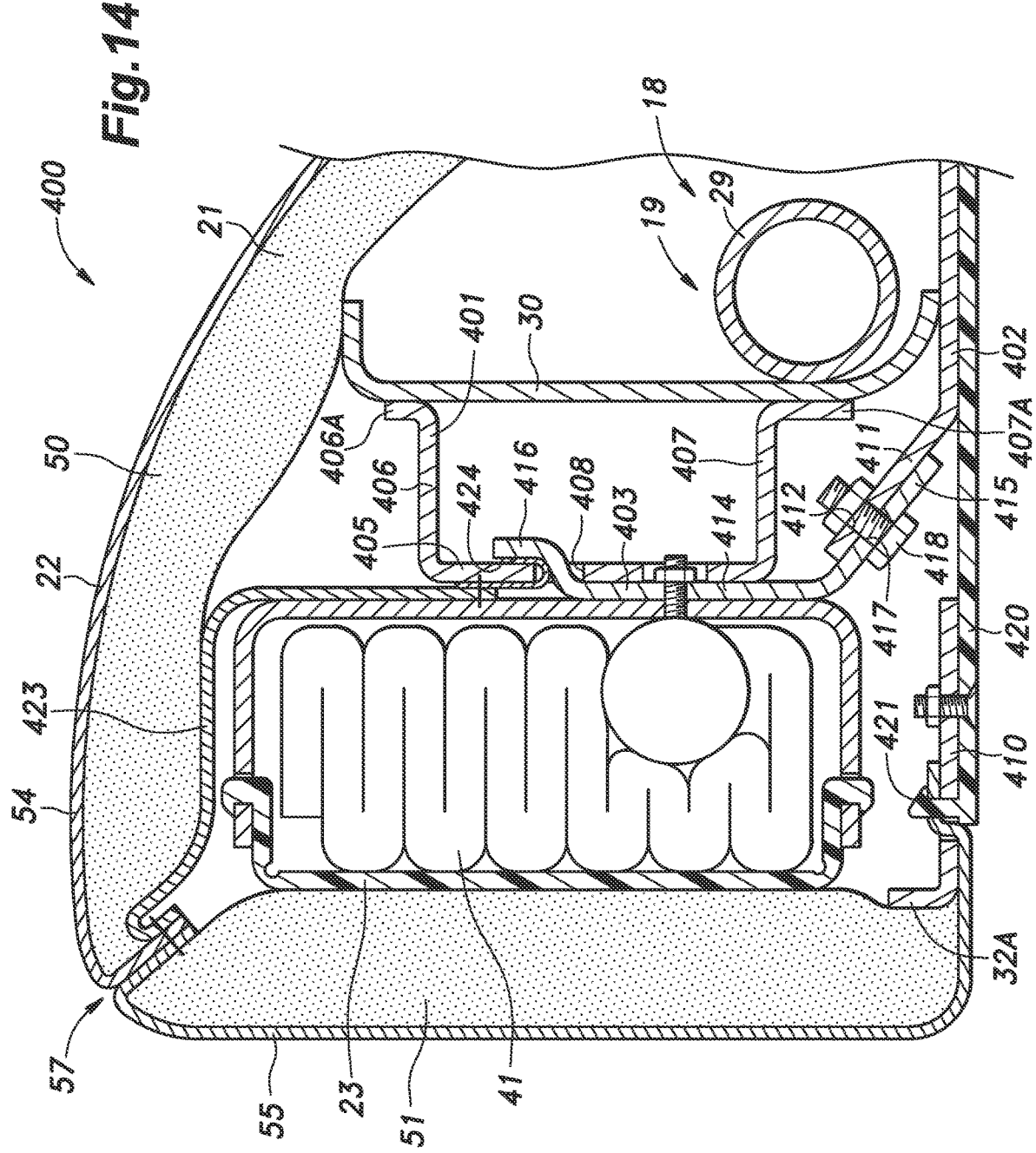
FIG. 14 is a sectional view of an upper part of the seatback of the vehicle seat of the fifth embodiment.

As shown in FIG. 14, the retainer 403 is formed by a bent sheet metal member similarly as in the first embodiment, and is provided with a plate-like retainer base 414 extending in the fore and aft and vertical directions, a plate-like retainer slanted wall 415 connected to the rear edge of the retainer base 414 and inclining rightward toward the rear, and a pair of retainer engaging walls 416 located one above the other and connected to the front edge of the retainer base 414. As in the first embodiment, the airbag module 23 is fastened to the retainer base 414 at a predetermined position. The airbag module 23 is positioned in front of the pan frame extension 410, and a clearance S is formed between the airbag module 23 and the pan frame extension 410.

The retainer slanted wall 415 extends along the front surface of the raised piece 411. A bolt hole 417 is passed therethrough in the thickness direction. The retainer slanted wall 415 and the raised piece 411 are fastened to each other by using a bolt 418 passed through the two bolt holes 412 and 417. As a result, the rear part of the retainer 403 is connected to the pan frame 402.

Each retainer engaging wall 416 is passed from the left side of the bracket base 405 into the bracket engaging hole 408, and extends to the right side of the bracket base 405 before being engaged by the edge of the bracket engaging hole 408. Thereby, the retainer engaging wall 416 is restricted from moving leftward, and the front part of the retainer 403 is connected to the bracket 401. In this embodiment, for each of the brackets 401, the retainer engaging wall 416 is provided in the front edge of the retainer base 414 so as to correspond to the bracket engaging hole 408 of the bracket 401.

In the present embodiment, a back board 420 is provided behind the pan frame 402 to cover the raised piece 411 from the rear. The back board 420 is a plastic plate substantially in the same shape as the pan frame 402, and extends along the rear surface of the pan frame 402 so as to face in the fore and aft direction. A plurality of board engaging portions 421 project forward along the left edge of the back board 420. A plurality of holes are arranged along the rear edge of the left side sheet material 55, and the left side sheet material 55 is attached to the back board 420 by engaging the board engaging portions 421 with these holes of the left side sheet material 55. The back board 420 is fastened to the pan frame 402 at predetermined positions.

In the present embodiment, no wire member is provided, and the webbing 423 is engaged to the bracket 401. More specifically, the webbing 423 is stitched to the stitched portion 57 at one end thereof similarly to the first embodiment, and after passing through a part located between the front surface portion 50 and the left side surface portion 51, reaches the bracket engaging hole 408. The other end of the webbing 423A is provided with a prescribed hook 424 which is engaged by the bracket engaging hole 408.

The effect of the vehicle seat 400 according to the fifth embodiment is discussed in the following. In the vehicle seat 400, as in the first embodiment, the airbag module 23 is positioned in front of the pan frame extension 410, and a clearance S is defined between the airbag module 23 and the pan frame extension 410. Therefore, the load applied to the back surface of the seatback 5 is not readily transmitted to the airbag module 23.

Since the retainer slanted wall 415 is fastened to the rear surface of the raised piece 411, the retainer slanted wall 415 and the raised piece 411 can be arranged so as to be visually recognized from the rear of the pan frame 402 at the time of fastening. Further, since the retainer 403 is connected to the side frame 26 and the pan frame 402, the airbag 41 can be supported by the seatback frame assembly 18 in a stable manner.

Sixth Embodiment

The vehicle seat 500 according to the sixth embodiment of the present invention differs from that of the first embodiment in the shapes of the brackets 501 and the retainer 502. The details of the shapes of the brackets 501 and the retainer 502 are described in the following.

Figure 15:
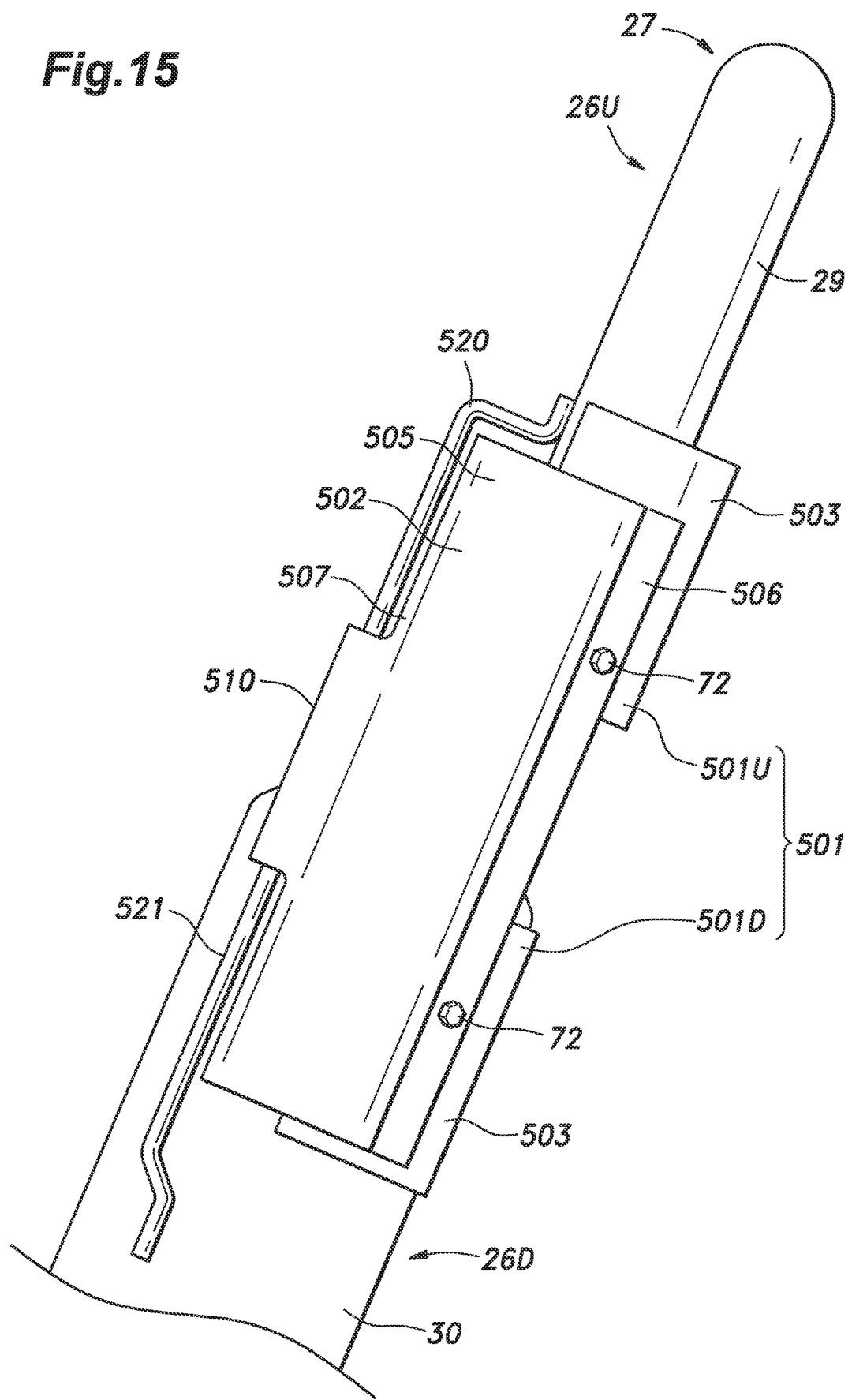
FIG. 15 is a perspective view of an upper part of the seatback of the vehicle seat of the fifth embodiment as seen from front.

As shown in FIG. 15, the upper bracket 501U is a bent sheet metal member which is welded to the pipe member 29 forming the side frame upper portion 26U at the rear end thereof, and extends obliquely leftward and forward. The lower bracket 501D is a bent sheet metal member similar to the upper bracket 501U, and is welded to the rear surface of the sheet metal member forming the upper part of the side frame lower portion 26D at the rear end thereof. A bracket slanted wall 503 is formed in a front part of the upper bracket 501U, and another bracket slanted wall 503 is similarly formed in a front part of the lower bracket 501D. Each bracket slanted wall 503 is provided with a bolt hole 504 (fastening portion) passed therethrough in the thickness direction. A nut is welded to the front surface of the bracket slanted wall 503 at a position aligning with the bolt hole 504.

The retainer 502 is a bent sheet metal member that extends in the fore and aft and vertical directions, and is provided with a plate-like retainer base 505 that faces in the lateral direction, a plate-like retainer slanted wall 506 connected to the rear edge of the retainer base 505 and slanting rightward toward the rear end thereof, and a retainer front portion 507 connected to the front edge of the retainer base 505. The retainer base 505 is provided with a bolt hole 508 passed therethrough in the thickness direction. By fastening the male thread portion 44 of the inflator 42 to the bolt hole 508, the airbag module 23 can be retained on the left side surface of the retainer base 505.

The retainer slanted wall 506 is formed with a bolt hole 509. The retainer slanted wall 506 (fastened portion) extends along the rear surface of the bracket slanted wall 503, and is fastened to the bracket slanted wall 503 by a bolt 72 (fastener) that is passed through the two bolt holes 504 and 509. As a result, the retainer 502 is fixedly connected to the bracket 501.

Figure 16:
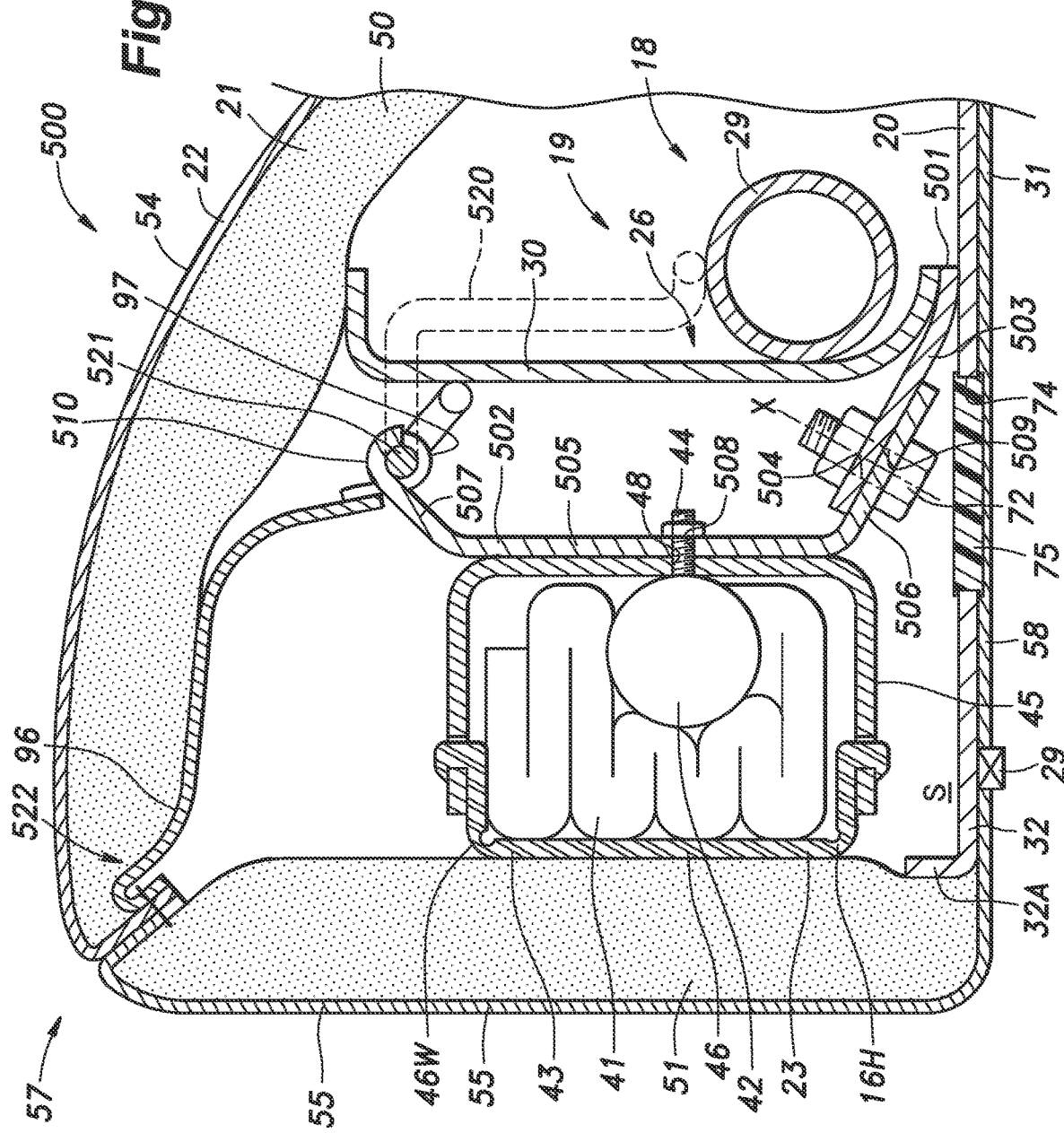
FIG. 16 is a cross sectional view of the vehicle seat of the fifth embodiment.

The retainer front portion 507 has a plate-shape that inclines forward from the front edge of the retainer base 505 toward the right end thereof. As shown in FIG. 16, the front edge of the retainer front portion 507 that extends in the vertical direction is centrally provided with a hook 510 in the form of a plate which is curled rightward in an arcuate manner at the free end thereof.

The pan frame 20 is provided with a pair of tool holes 74 for permitting access to the heads of the bolts 72. The tool holes 74 are each passed through the pan frame 20, and are provided on an extension line of the axial line X of the corresponding bolt 72. The tool holes 74 are dimensioned so as to allow a tool (for example, a universal wrench) for fastening the bolts 72 to be inserted. The pan frame 20 is provided with a pair of plastic closure member 75 for closing the tool holes 74.

As shown in FIG. 15, a wire member 520 is connected to the left side frame 26. The wire member 520 is formed by bending a metal rod having a circular cross section, and is welded to the left side surface of the sheet metal member 30 at one end thereof and to the front surface of the pipe member 29 at the other end thereof. The wire member 520 is provided with an engaging portion 521 extending vertically along the extending direction of the left side frame 26 at a substantially central part thereof. The engaging portion 521 is located in front of the airbag module 23, to the left of the side frame 26, to the right of the retainer base 505, and in front of the bracket slanted wall 503. The hook 510 is engaged to the wire member 520 so that the retainer 502 is engaged to the wire member 520 at the front end thereof and fastened to the bracket 501 at the rear end thereof.

The skin member 22 s provided with a webbing 96. The webbing 96 is formed of a sheet-like member that is less stretchable than the skin member 22. One end of the webbing 96 is stitched to the front sheet material 54 and the left side sheet material 55 at the stitched portion 57.

Since the front surface portion 50 and the left side surface portion 51 are formed of separate cushion materials, a passage 522 is defined therebetween. The webbing 96 extends from one end thereof through the passage 522 defined between the front surface portion 50 and the left side surface portion 51, and reaches the engaging portion 521 of the wire member 520. A hook 97 is provided at the other end of the webbing 96, and is engaged to the engaging portion 521 of the wire member 520, The effect of the vehicle seat 500 is discussed in the following. The webbing 96 is connected to the engaging portion 521 located in front of the airbag module 23. Since the engaging portion 521 is located in front of the airbag module 23, the engaging portion 521 can be visually recognized from the lateral side with ease. Therefore, it can be easily confirmed that the webbing 96 is connected to the appropriate position of the wire member 520.

Figure 17:
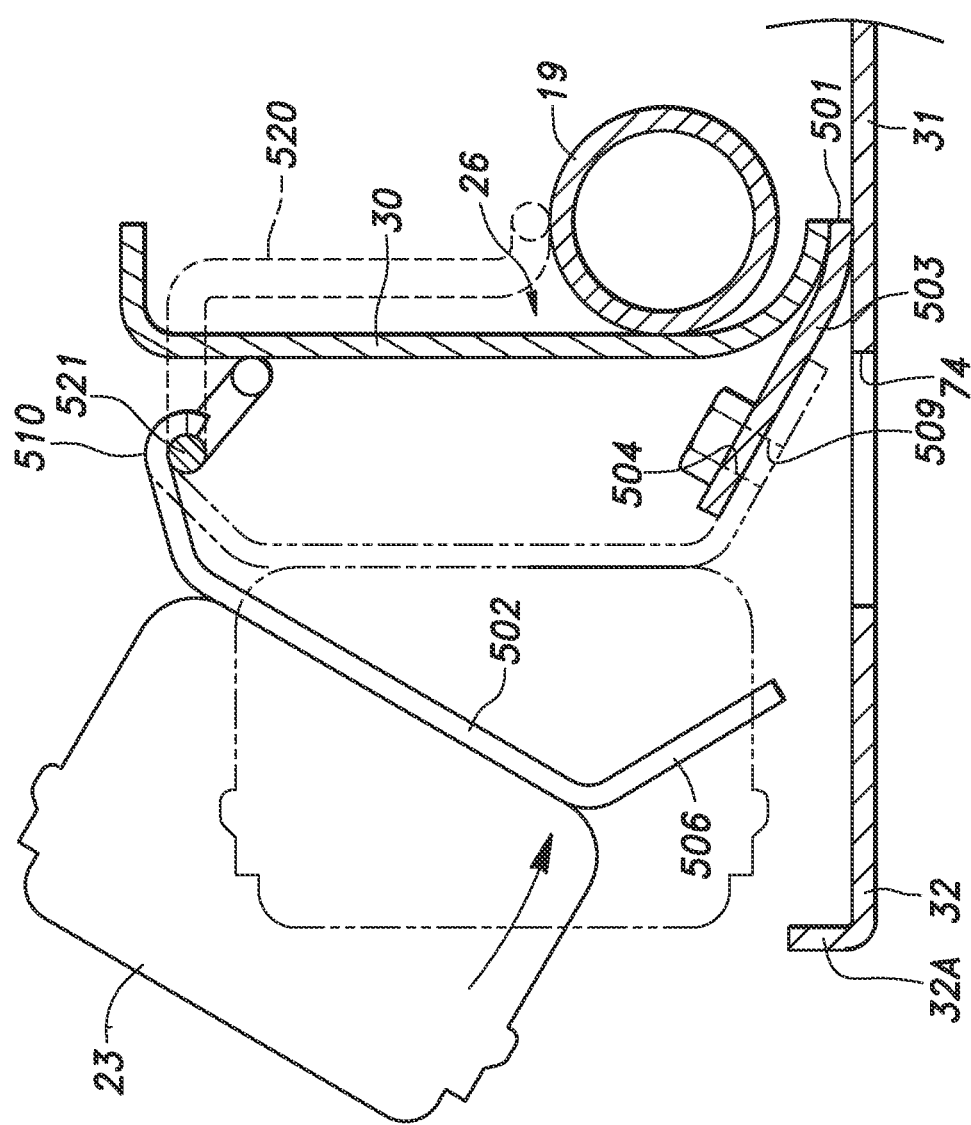
FIG. 17 is an explanatory view showing the movement of a retainer when fastening an airbag module in the vehicle seat of the sixth embodiment.

As shown in FIG. 17, after the hook 510 is engaged to the engaging portion 521, the retainer 502 is rotated counterclockwise (in the direction of the arrow) about the axial line of the engaging portion 521 extending in the vertical direction with the result that the retainer 502 is guided relative to the bracket 501 to an appropriate position (double-dot chain line in FIG. 17) where the two bolt holes 504 and 509 are aligned with each other. Thereby, the retainer 502 and the airbag module 23 can be correctly positioned with ease. Thus, the bolt 72 can be passed through the two bolt holes 504 and 509, and tightened with ease so that the airbag module 23 can be easily connected to the side frame 26. Moreover, since the hook 510 is engaged to the engaging portion 521, the rearward movement to the airbag module 23 is prevented so that the airbag module 23 can be correctly positioned with ease.

The wire member 520 serves not only to guide the airbag module 23 that is to be correctly positioned and connected to the side frame 26, but also to support the end of the webbing 96 so as to appropriately concentrate the loading created by the inflation of the airbag 41. Thus, the wire member 520 for supporting the webbing 96 by connecting the webbing to the side frame 26 is also used for positioning the airbag module 23. Thus, the need for a separate member for positioning the airbag module 23 can be eliminated, and the structure of the vehicle seat 500 can be simplified.

In this embodiment, even after the airbag module 23 is assembled, the front edge of the retainer 502 is engaged by the wire member 520 as shown in FIG. 15. The rear edge of the retainer 502 is fastened to the side frame 26 by the bolt 72. Since the retainer 502 is connected to the side frame 26 both at the front and rear, the retainer 502 and the side frame 26 can be sufficiently firmly connected to each other so that the airbag module 23 is prevented from moving relative to the side frame 26. Thereby, the attitude of the airbag 41 at the time of deployment can be stabilized.

Compared with the case where the bolt 72 is fastened to the wall extending in the lateral direction, when the bolt 72 is fastened to the wall inclined with respect to the lateral direction, the amount of protrusion of the head of the bolt 72 toward the rear is reduced. In the present embodiment, the amount of protrusion of the head of the bolt 72 to the rear is reduced by inclining the bracket slanted wall 503 to which the bolt 72 is fastened with respect to the lateral direction. Further, since the rear surface of the bracket slanted wall 503 faces obliquely rearward, the head of the bolt 72 can be visually recognized from the rear of the pan frame 20 with ease so that the fastening work of the retainer 502 and the bracket 501 is facilitated.

The present invention was described in terms of specific embodiments, but is not limited by such embodiments, and can be modified in various ways without departing from the scope of the present invention. The present invention was applied to the rear seats in the second row in the foregoing embodiments, but may also be applied to the rear seats in the third row or in a row further behind, instead of the second row. Further, the webbing and the wire member are not essential for the present invention, and it is also possible to use plurality of webbings or a plurality of wire members within the purview of the present invention.

The hook 510 was formed by curving the front end of the sheet metal member in the sixth embodiment. However, the hook 510 may also be in any form as long as the hook 510 pivotably engages the engaging portion 521. For example, the hook 510 may be formed by a pair of plate members that are curved along the left and right side surfaces of the engaging portion 521 so as to pivotably support the engaging portion 521 from the rear.

GLOSSARY OF TERMS

| | |
|---|---|
| 1: vehicle seat | 5: seatback |
| 19: seatback frame main body | 20: pan frame (plate) |
| 23; airbag module | 26: side frame (side member) |
| 32: pan frame extension | 36: bracket (first mounting member) |
| 47: retainer (second mounting member) | 64: bracket slanted wall |
| 65: bolt hole (fastening portion) | 100: vehicle seat of the second embodiment |
| 101: bracket (first mounting member) | 102: retainer (second mounting member) 105: bracket rear wall (rear wall portion) |
| | 107: bolt hole (fastening portion) |
| 119: bolt (fastener) | 200: vehicle seat of the third embodiment |
| 202: retainer (second mounting member) | 216: bolt (fastener) |
| 220: tool hole (through hole) | 300: vehicle seat of the fourth embodiment |
| 301: side frame (side member) | 302: bracket (first mounting member) |
| 303: retainer (second mounting member) | 305: extension wall |
| 311: retainer upper wall | |
| 312: retainer engaging portion (engaging portion) | |
| 400: vehicle seat of the fifth embodiment | 401: bracket (first mounting member) |
| 402: pan frame | 403: retainer (second mounting member) |
| 410: pan frame extension (extension) | 411: raised piece |
| 500: vehicle seat of the sixth embodiment | 501: bracket (expansion member) |
| 502: retainer (retaining member) | 504: bolt hole (fastening portion) |
| 506: retainer slanted wall (fastened portion) | 510: hook |
| 520: wire member | 521: engaging portion |
| 522: passage | S: clearance |

The invention claimed is:

1. A vehicle seat, comprising:
a seatback frame including a pair of side members extending vertically along either side thereof and providing a structural framework of a seatback;
a plate member positioned behind the seatback frame and including an extension extending in an outboard direction from the side member located on an outboard side of the seatback frame: and
a mounting member connected to the outboard side member; and an airbag module located in front of the extension and connected to the outboard side member via the mounting member,
wherein the mounting member includes a first mounting member directly connected to the outboard side member, and a second mounting member directly connected to the airbag module, and the second mounting member is connected to the first mounting member via a fastener, the first mounting member being provided with a slanted wall which is slanted in an inboard direction toward a rear end part thereof, and provided with a fastening portion to which the second mounting portion is fastened,
wherein the plate member is provided with a through ole passed along an axial line of the fastener, and
wherein the first mounting member includes a pair of first mounting members positioned on the outboard side member one above the other.

2. The vehicle seat according to claim 1, wherein a rear end part of the second mounting member is provided with a plate-like fastened portion extending along the slanted wall, and the airbag module is provided with an airbag configured to be deployed in a forward direction, a front part of the fastened portion being connected to the second mounting member.

3. The vehicle seat according to claim 1, wherein the seatback can be moved between a use position where the seatback faces forward, and a stowed position where the back side of the seatback extends in parallel with a floor surface, and the plate member is provided with a closure member closing the through hole.

4. A manufacturing method of a vehicle seat, comprising:
providing a seatback frame, wherein the seatback frame includes a pair of side members extending vertically along either side thereof,
positioning a plate member behind the seatback frame wherein the plate member includes an extension extending in an outboard direction from the side member located on an outboard side of the seatback frame;
connecting a first mounting member directly to the outboard side member wherein the first mounting member is provided with a slanted wall which is slanted in an inboard direction toward a rear end part thereof and a fastening portion;
providing a second mounting portion directly connected to an airbag module;
locating an airbag module in front of the extension; and
connecting the second mounting portion directly to the first mounting member by fastening to the fastening portion.

5. A vehicle seat, comprising:
a seatback frame including a pair of side members extending vertically along either side thereof and providing a structural framework of a seatback;
a plate member positioned behind the seatback frame and including an extension extending in an outboard direction from the side member located on an outboard side of the seatback frame; and
a mounting member connected to the outboard side member; and an airbag module located in front of the extension and connected to the outboard side member via the mounting member,
wherein the mounting member includes a first mounting member directly connected to the outboard side member, and a second mounting member directly connected to the airbag module, and the second mounting member is connected to the first mounting member via a fastener, the first mounting member being provided with a slanted wall which is slanted in an inboard direction toward a rear end part thereof, and provided with a fastening portion to which the second mounting portion is fastened, wherein the plate member is provided with a through hole passed along an axial line of the fastener, and wherein the seatback can be moved between a use position where the seatback faces forward, and a stowed position where the back side of the seatback extends in parallel with a floor surface, and the plate member is provided with a closure member closing the through hole.

\* \* \* \* \*